(12) United States Patent
Stern

(10) Patent No.: US 7,069,274 B2
(45) Date of Patent: Jun. 27, 2006

(54) METHOD AND APPARATUS FOR CATALOGUING AND SCRIPTING THE DISPLAY OF INFORMATIONAL CONTENT

(75) Inventor: Michael R. Stern, Mill Valley, CA (US)

(73) Assignee: PRN Corporation, San Francisco, CA (US)

( * ) Notice: Subject to any disclaimer, the term of this patent is extended or adjusted under 35 U.S.C. 154(b) by 58 days.

(21) Appl. No.: 10/420,590

(22) Filed: Apr. 21, 2003

(65) Prior Publication Data

US 2003/0208469 A1 Nov. 6, 2003

Related U.S. Application Data

(62) Division of application No. 09/602,559, filed on Jun. 23, 2000, now Pat. No. 6,654,757, which is a division of application No. 09/130,900, filed on Aug. 7, 1998, now Pat. No. 6,553,404.

(60) Provisional application No. 60/055,708, filed on Aug. 8, 1997.

(51) Int. Cl.
*G06F 7/00* (2006.01)

(52) U.S. Cl. .................... 707/104.1; 705/26; 707/4
(58) Field of Classification Search .......... 707/104.1, 707/3–5; 705/26; 375/220; 369/84; 700/234
See application file for complete search history.

(56) References Cited

U.S. PATENT DOCUMENTS

| | | | |
|---|---|---|---|
| 3,947,882 A | 3/1976 | Lightner | 360/92 |
| 4,092,732 A | 5/1978 | Ouchi | 364/900 |
| 4,247,759 A | 1/1981 | Yuris et al. | 235/381 |
| 4,262,302 A | 4/1981 | Sexton | 358/10 |
| 4,300,040 A | 11/1981 | Gould et al. | 235/381 |

(Continued)

FOREIGN PATENT DOCUMENTS

| | | |
|---|---|---|
| EP | 0 649 121 A2 | 4/1995 |
| WO | WO 96/08113 | 3/1996 |

OTHER PUBLICATIONS

Miller et al., "StarBurst Multicast File Transfer Protocol (MFTP) Specification", Meta communication dated Feb. 13, 1997 (1 page).
Hurwicz, M., "The IP Multicast Standard is Ready, but the Infrastructure isn't. Yet.", *Multicast to the Masses*, from Byte.com, Jun. 1997 issue (4 pages).
PointCast Press Release; " Broadcast Capability For Corporate Intranet" Dec. 22, 1998, pp. 1–8.
Collins,D.J.; "Using Bar Code, Why It's Taking Over"; Data Capture Institute, second edition, Feb. 29, 1991.
Tanenbaum, A.S; "Computer Networks", Third Edition; pp. 722–761; Oct. 13, 1998.

*Primary Examiner*—Greta Robinson
*Assistant Examiner*—Sathyanarayan Pannala
(74) *Attorney, Agent, or Firm*—Pillsbury Winthrop Shaw Pittman LLP

(57) ABSTRACT

A digital department system is disclosed. The digital department system of the present invention includes a network management center, a network operating center that is coupled to the network management center, a multimedia server, a multicasting transmission medium coupling the network operating center and the multimedia server, a listening post coupled to the multimedia server by the network, and one or more audio/video display capable of displaying video and capable of playing audio, the audio video display coupled to the multimedia server by the network. The audio and video content are stored in digitized files on the multimedia server for distribution throughout the site via the network.

10 Claims, 5 Drawing Sheets

U.S. PATENT DOCUMENTS

| | | | |
|---|---|---|---|
| 4,305,131 A | 12/1981 | Best | 364/521 |
| 4,405,984 A | 9/1983 | Siegel et al. | 364/410 |
| 4,414,467 A | 11/1983 | Gould et al. | 235/381 |
| 4,490,810 A | 12/1984 | Hon | 364/900 |
| 4,544,920 A | 10/1985 | Hamlin | 340/565 |
| 4,593,376 A | 6/1986 | Volk | 364/900 |
| 4,598,810 A | 7/1986 | Shore et al. | 194/205 |
| 4,616,263 A | 10/1986 | Eichelberger | 358/185 |
| 4,647,989 A | 3/1987 | Geddes | 360/55 |
| 4,654,799 A | 3/1987 | Ogaki et al. | 364/479 |
| 4,660,101 A | 4/1987 | Martin | 358/342 |
| 4,667,802 A | 5/1987 | Verduin et al. | 194/217 |
| 4,672,554 A | 6/1987 | Ogaki | 364/479 |
| 4,674,055 A | 6/1987 | Ogaki et al. | 364/479 |
| 4,685,001 A | 8/1987 | Martin | 358/342 |
| 4,685,003 A | 8/1987 | Westland | 360/14.1 |
| 4,688,105 A | 8/1987 | Bloch et al. | 358/335 |
| 4,703,465 A | 10/1987 | Parker | 369/30 |
| 4,717,971 A | 1/1988 | Sawyer | 358/342 |
| 4,766,581 A | 8/1988 | Korn et al. | 369/30 |
| 4,782,401 A | 11/1988 | Faerber et al. | 358/335 |
| 4,800,331 A | 1/1989 | Vesce et al. | 323/277 |
| 4,807,224 A | 2/1989 | Naron et al. | 370/94 |
| 4,827,347 A | 5/1989 | Bell | 358/224 |
| 4,882,724 A | 11/1989 | Vela et al. | 364/401 |
| 4,896,791 A | 1/1990 | Smith | 221/7 |
| 4,899,331 A | 2/1990 | Masaki et al. | 369/32 |
| 4,905,077 A | 2/1990 | Ishii | 358/22 |
| 4,905,094 A | 2/1990 | Pocock et al. | 358/342 |
| 4,937,807 A | 6/1990 | Weitz et al. | 369/85 |
| 4,949,322 A | 8/1990 | Kimura et al. | 369/32 |
| 4,962,466 A | 10/1990 | Revesz et al. | 364/518 |
| 4,964,004 A | 10/1990 | Barker | 360/14.1 |
| 4,984,098 A | 1/1991 | Buntsis | 360/12 |
| 5,051,973 A | 9/1991 | Shiba et al. | 369/36 |
| 5,084,768 A | 1/1992 | Stern et al. | 358/342 |
| 5,105,402 A | 4/1992 | Ishii et al. | 369/43 |
| 5,180,192 A * | 1/1993 | Herbert | 283/101 |
| 5,237,157 A | 8/1993 | Kaplan | 235/375 |
| 5,263,199 A | 11/1993 | Barnes et al. | 455/344 |
| 5,341,476 A | 8/1994 | Lowell | 395/200 |
| 5,392,066 A | 2/1995 | Fisher et al. | 348/8 |
| 5,457,376 A | 10/1995 | Chong et al. | 320/2 |
| 5,459,702 A | 10/1995 | Greenspan | 369/25 |
| 5,467,326 A | 11/1995 | Miyashita et al. | 369/30 |
| 5,483,506 A | 1/1996 | Yoshioka et al. | 369/7 |
| 5,504,675 A | 4/1996 | Cragun et al. | 364/401 |
| 5,526,482 A | 6/1996 | Stallmo et al. | 395/182.04 |
| 5,532,680 A | 7/1996 | Ousborne | 340/567 |
| 5,539,635 A * | 7/1996 | Larson, Jr. | 700/234 |
| 5,544,354 A * | 8/1996 | May et al. | 707/4 |
| 5,557,721 A | 9/1996 | Fite et al. | 395/18 |
| 5,568,612 A | 10/1996 | Barrett et al. | 395/200.01 |
| 5,583,501 A | 12/1996 | Henrion et al. | 341/118 |
| 5,592,511 A * | 1/1997 | Schoen et al. | 375/220 |
| 5,612,730 A | 3/1997 | Lewis | 348/8 |
| 5,617,565 A | 4/1997 | Augenbraun et al. | 395/604 |
| 5,625,864 A | 4/1997 | Budow et al. | 455/4.2 |
| 5,629,867 A | 5/1997 | Goldman | 364/514 |
| 5,634,022 A | 5/1997 | Crouse et al. | 395/704 |
| 5,640,193 A | 6/1997 | Wellner | 348/7 |
| 5,640,453 A | 6/1997 | Schuchman et al. | 380/10 |
| 5,642,171 A | 6/1997 | Baumgartner et al. | 348/515 |
| 5,642,484 A | 6/1997 | Harrison, III et al. | 395/214 |
| 5,708,845 A | 1/1998 | Wistendahl et al. | 395/806 |
| 5,724,424 A | 3/1998 | Gifford | 380/24 |
| 5,729,471 A | 3/1998 | Jain et al. | 348/13 |
| 5,740,134 A * | 4/1998 | Peterson | 700/234 |
| 5,758,257 A | 5/1998 | Herz et al. | 455/2.01 |
| 5,764,901 A | 6/1998 | Skarbo et al. | 395/200.34 |
| 5,784,527 A | 7/1998 | Ort | 386/111 |
| 5,794,217 A | 8/1998 | Allen | 705/27 |
| 5,815,471 A | 9/1998 | Mince et al. | 369/30 |
| 5,875,437 A | 2/1999 | Atkins | 705/40 |
| 5,918,213 A * | 6/1999 | Bernard et al. | 705/26 |
| 5,950,173 A | 9/1999 | Perkowski | 705/26 |
| 5,956,716 A | 9/1999 | Kenner et al. | 707/10 |
| 5,959,944 A * | 9/1999 | Dockes et al. | 369/84 |
| 6,026,409 A | 2/2000 | Blumenthal | 707/104 |
| 6,085,243 A | 7/2000 | Fletcher et al. | 709/224 |
| 6,134,547 A * | 10/2000 | Huxley et al. | 707/5 |
| 6,199,051 B1 | 3/2001 | Gifford | 705/75 |
| 6,226,672 B1 | 5/2001 | DeMartin et al. | 709/219 |
| 2001/0040532 A1 * | 11/2001 | Yasuda | |

* cited by examiner

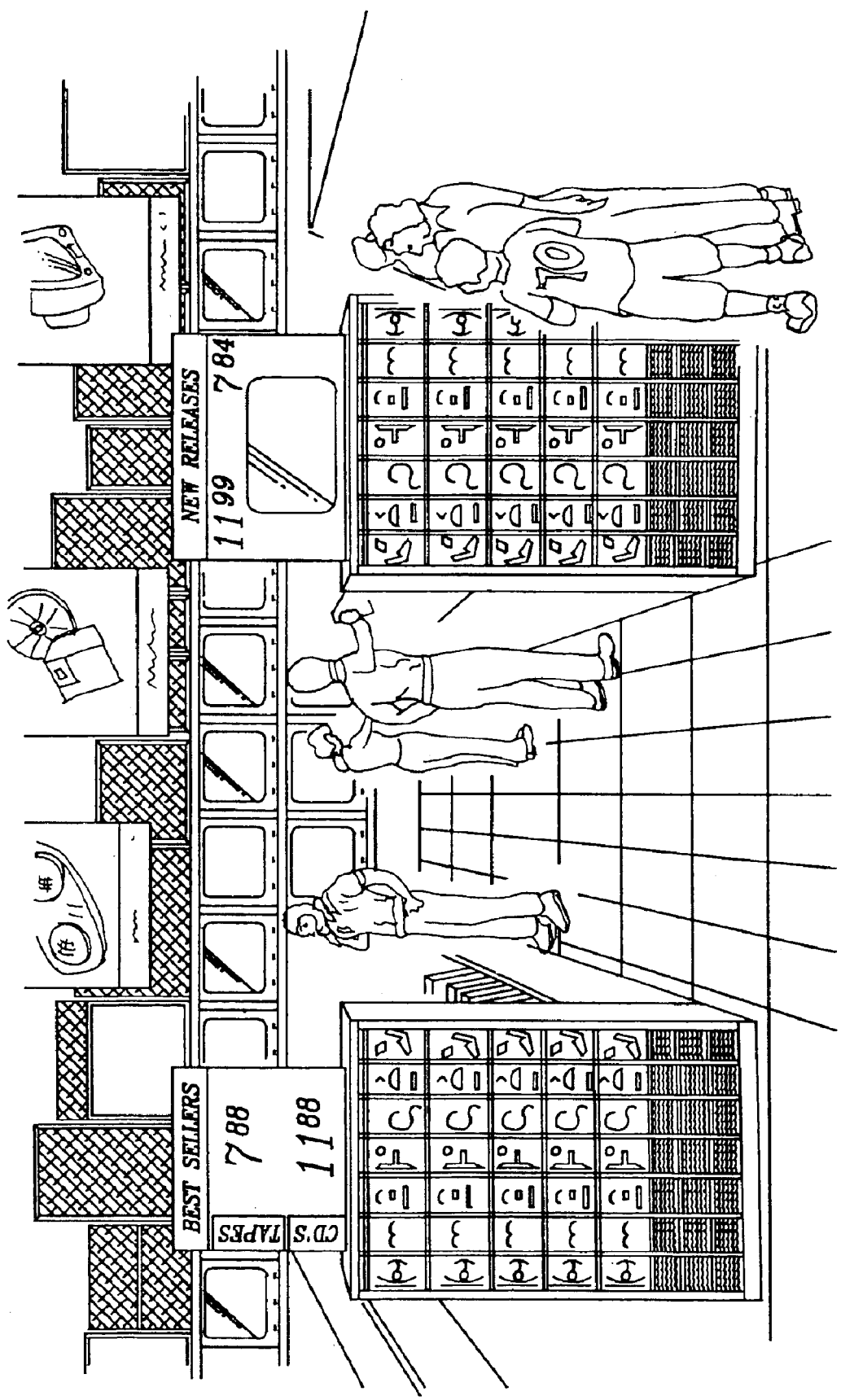
FIG. −2A

METHOD AND APPARATUS FOR CATALOGUING AND SCRIPTING THE DISPLAY OF INFORMATIONAL CONTENT

CLAIM OF BENEFIT FROM PRIORITY APPLICATIONS

This application claims the benefit of priority from and is a Divisional Application of U.S. Ser. No. 09/602,559, filed Jun. 23, 2000 by inventor Michael R. Stern, now U.S. Pat. No. 6,654,757, which is a Divisional Application of U.S. Ser. No. 09/130,900, filed Aug. 7, 1998 by inventor Michael R. Stern, which is scheduled to issue on Apr. 22, 2003 as U.S. Pat. No. 6,553,404 and which claims priority under 35 U.S.C. §119(e) to Provisional Application Ser. No. 60/055,708, filed Aug. 8, 1997 by inventor Michael R. Stern, all of which are commonly-owned and are incorporated herein by reference in their entirety and for all purposes.

CROSS-REFERENCE TO RELATED U.S. PATENTS

This application is related to the following commonly-owned U.S. Patents, all of which are incorporated herein by reference in their entirety and for all purposes:

| Number | Issue Date | Inventor(s) | Title |
| --- | --- | --- | --- |
| *6,553,404 | *Apr. 22, 2003 | Stern | Method and Apparatus for Distributing Audiovisual Content |
| 6,539,417 | Mar. 25, 2003 | Stern | Reconfigurable audiovisual previewing system and method of operation |
| 6,366,914 | Apr. 2, 2002 | Stern | Audiovisual content distribution system |
| 5,990,879 | Nov. 23, 1999 | Mince | Method and apparatus for dynamically arranging information in a presentation sequence to minimize information loss |
| 5,815,471 | Sep. 29, 1998 | Mince et al. | Method and apparatus for previewing audio selections |
| 5,084,768 | Jan. 28, 1992 | Stern et al. | Method and apparatus for previewing recorded information |

*Note:
This patent is scheduled to issue on the date shown.

CROSS-REFERENCE TO RELATED U.S. PATENT APPLICATIONS

This application is related to the following commonly-owned U.S. Patent Applications, all of which are incorporated herein by reference in their entirety and for all purposes:

| Number | File Date | Inventor | Title |
| --- | --- | --- | --- |
| 10/410,855 [044191-0302227] | Apr. 9, 2003 | Stern | Method and Apparatus for Distributing Promotional Material to a User in a Commercial Sales Outlet |
| 10/420,589 [044191-0302229] | Apr. 21, 2003 | Stern | Method and Apparatus for Gathering Statistical Information about In-Store Content Distribution |

BACKGROUND OF THE INVENTION

The present invention relates generally to a method and apparatus for the distribution of audiovisual content to consumers. More specifically, the present invention audiovisual content to consumers, wherein the audiovisual content is related to a given product's content or advertising regarding the product.

Commercial television and radio have been recognized as a powerful and efficient medium for broadcasting advertising and entertainment content to a large, widely dispersed audience. As a result, television and radio have traditionally garnered a major share of advertising budgets. However, due to a variety of factors, advertising revenues for these media outlets have been dropping over the past several years, a trend which is expected to continue. One major drawback of television and radio advertising is the failure of these media to do more than deliver a large number of impressions to a large and relatively undifferentiated audience. Advertising dollars are ineffectively spent on messages that reach the wrong audiences under the wrong circumstances. Further, national network television is well suited only for the limited number of product categories which are truly national in scope and relatively impervious to regional and seasonal variation. Moreover, the cost of multiple regional campaigns to address such issues on local television or radio stations, for example, will often equal or exceed that of a national program.

Delivery of advertising and product content at the point-of-purchase accomplishes what in-home television cannot, in large part because it is directed not toward passive, unreceptive viewers, but rather toward consumers who are actively seeking information and making choices based on that information. Ample evidence demonstrates consumers in a shopping environment are much more susceptible to audiovisual messages regarding products in which they have a current, specific interest than otherwise.

Indeed, with the vast quantity of available products and services, such as for example music or video selections, a consumer is faced with a formidable task in selecting which products they may wish to purchase. Providers of goods and services are constantly devising strategies for educating consumers about their products. This is especially true for providers of goods and services which are complex and/or numerous. Unfortunately, consumers are often frustrated by a lack of information, which can lead to the purchase of an unintended product or service. In other cases, the consumer may avoid purchasing a product or service altogether due to frustration and confusion arising from the vast quantity of available products.

However, current point-of-purchase advertising programs have severe limitations. For the most part they are based on a static, print oriented media comprised of signage or packing labels, with product messages lost in the clutter. On site demonstrations or educational devices are often prohibitively expensive, take up valuable selling space, and are limited to a store-by-store approach.

One known system of electronic point-of-purchase advertising utilizes silent electronic dot repeating message signs, similar to reader boards found in major airports and brokerage houses, in the high-traffic aisles of supermarkets. Such silent reader boards, with limited two dimensional displays, do not have the effectiveness of audiovisual presentations in catching and retaining viewer attention.

Another known variation on electronic point-of-purchase advertising utilizes electronic display screens such as liquid crystal displays on individual shopping carts which convey messages to the shopper. Such systems again do not have the effectiveness of audiovisual presentations, and further require a great deal of maintenance down-time due to their susceptibility to damage. Other known systems use satellite-transmitted television to broadcast advertising into supermarkets. Such systems are typically based on commercial network programming, although some permit the selective customization of promotional messages by aisle, store, chain, geographic area or demographic profile. However, the efficacy of these satellite-based systems, as well as the other techniques described, depends on attracting and holding the customer's attention. If the information provided to the customer is not useful or pertinent, the customer is not assisted in the purchasing decision. Indeed, the provision of such information is not only pointless, but detrimental, in that there is then additional sensory input with which the customer must contend. And while interactive consumer information systems exist (e.g., kiosks), such systems cannot be quickly updated to reflect changes in inventory, product revisions, changing demographics, or the like. Because inventory, products, and consumer preferences change, a system is needed which not only allows the consumer to preview product information, but also allows the information being previewed to be quickly and easily updated.

The above represent just a few of the shortcomings which have persisted in the field of consumer information systems A system capable of aggregating and distributing advertising and product content, and allowing a customer to interactively preview selected portions of that content is therefore highly desirable.

SUMMARY OF THE INVENTION

The present invention relates to a system for the distribution of content. More specifically, the present invention provides for a digital department system that allows consumers to preview content, product demonstrations, advertising, and other informational, entertainment, and promotional content, automatically and in response to consumer inputs.

In one embodiment of the present invention, a digital department system is provided. The digital department system of the present invention includes a network management center, a network operating center that is coupled to the network management center, a multimedia server, a multicasting transmission medium coupling the network operating center and the multimedia server, a listening post coupled to the multimedia server by the network, and one or more audio/video display capable of displaying video and capable of playing audio, the audio video display coupled to the multimedia server by the network. The audio and video content are stored in digitized files on the multimedia server for distribution throughout the site via the network.

A further understanding of the nature and advantages of the present invention may be realized by reference to the remaining portions of the specification and the drawings.

BRIEF DESCRIPTION OF THE DRAWINGS

FIG. 2A is a view of one embodiment of an interactive endcap according to the present invention;

DETAILED DESCRIPTION OF THE INVENTION

I. Introduction

In an embodiment of the present invention a new digital content distribution network is presented, providing commercial sales outlets of a commercial entity expanded bandwidth for delivery of video, audio, graphics, text, data, and other types of information streams within (and also, optionally, outside of) these commercial sales outlets. This new paradigm redefines in store merchandising in the mass merchant channel and creates a new commercial sales environment which stimulates sales by offering customers entertainment and extensive product information in a simple, easy to use format.

Figure 1A:
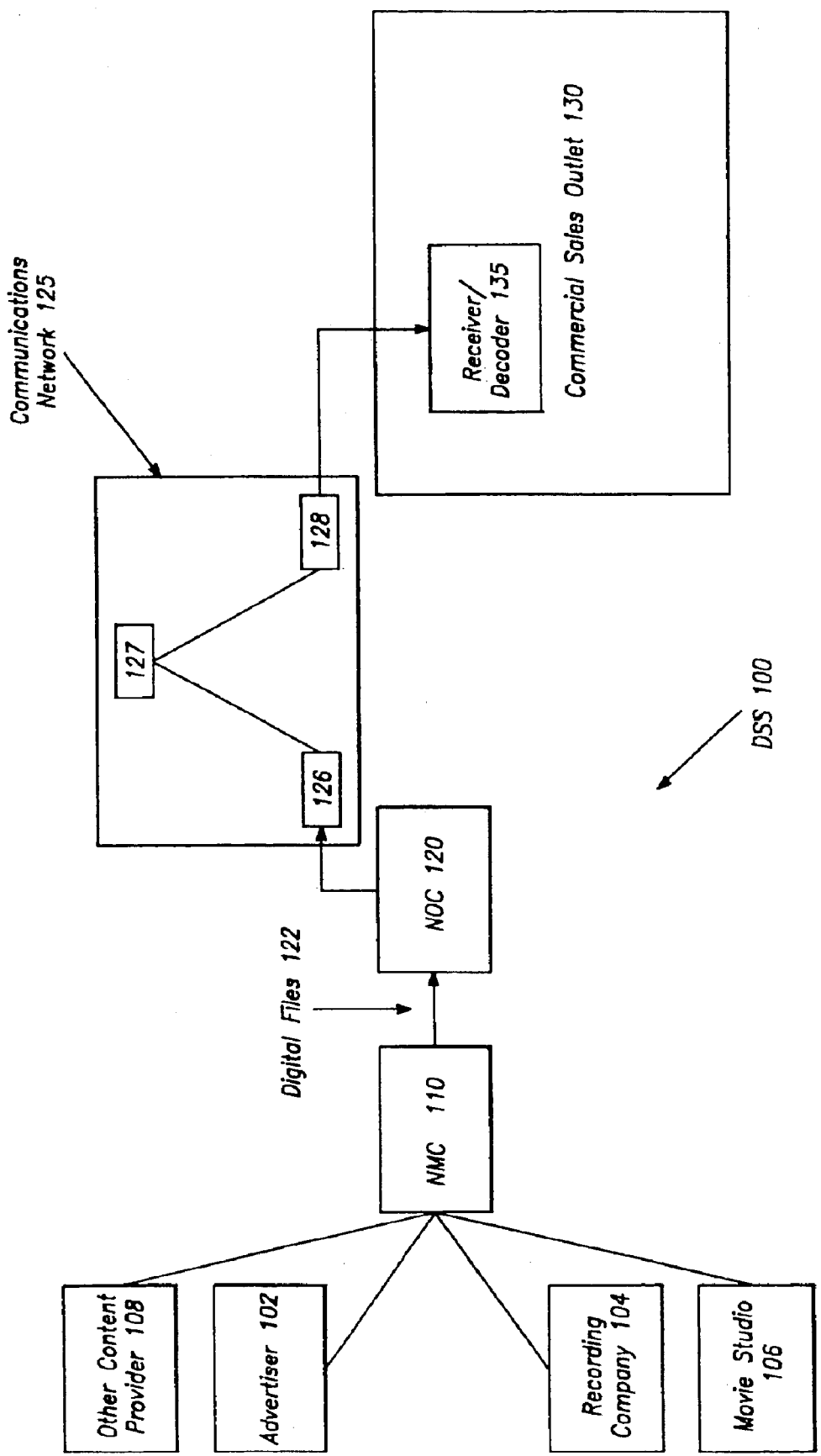
FIGS. 1A and 1B illustrate one embodiment of a digital department system according to the present invention.
Figure 1B:
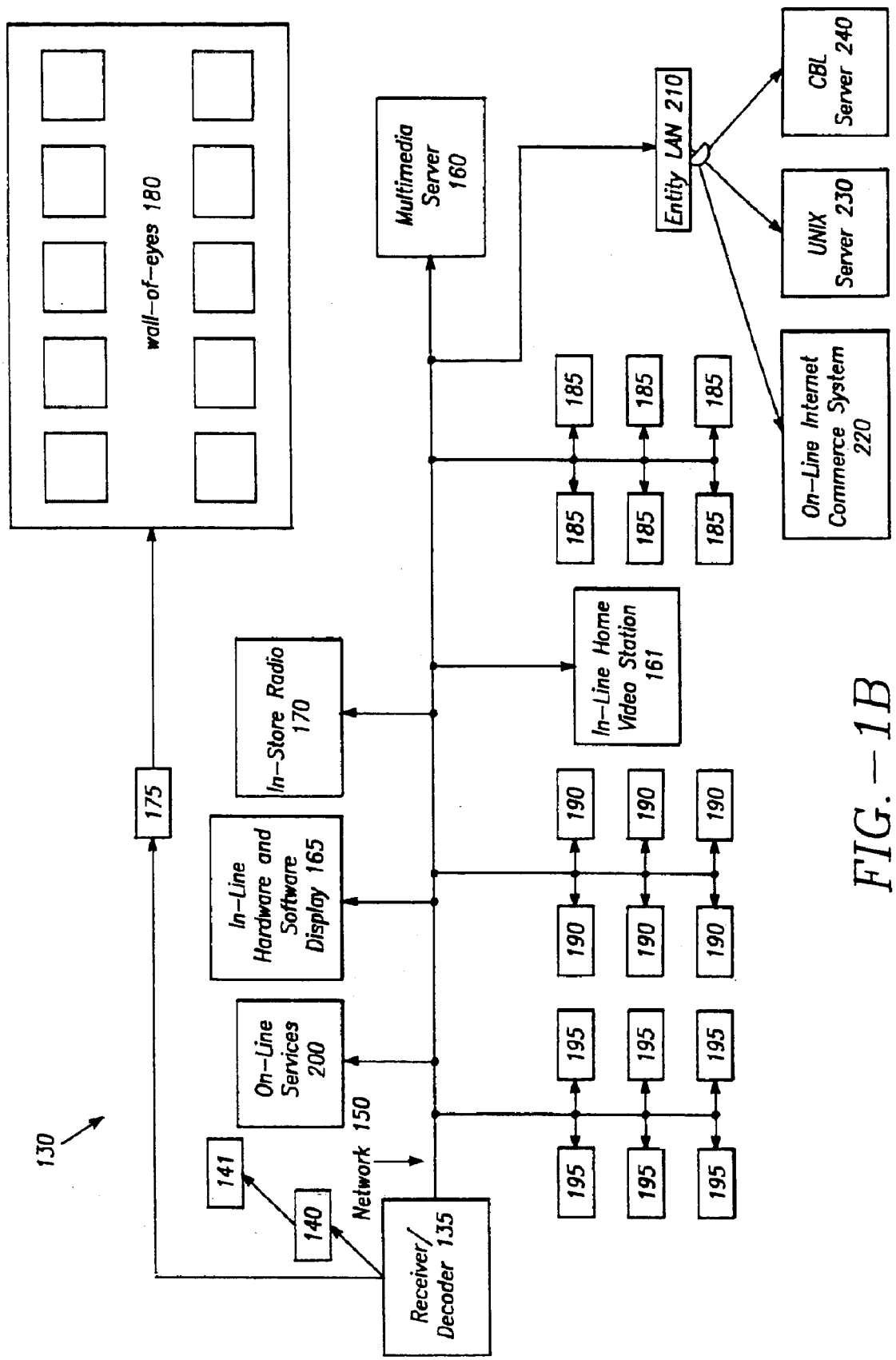
Figure 2B:
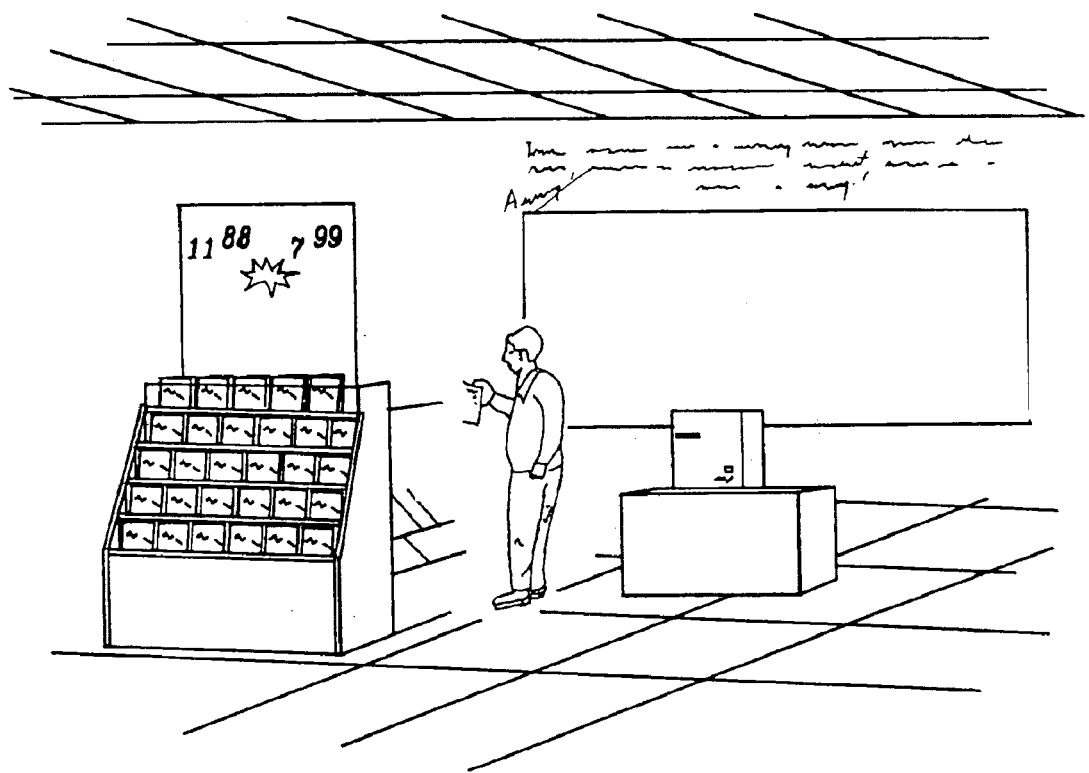
FIG. 2B is another view of one embodiment of an interactive endcap according to the present invention.
Figure 2C:
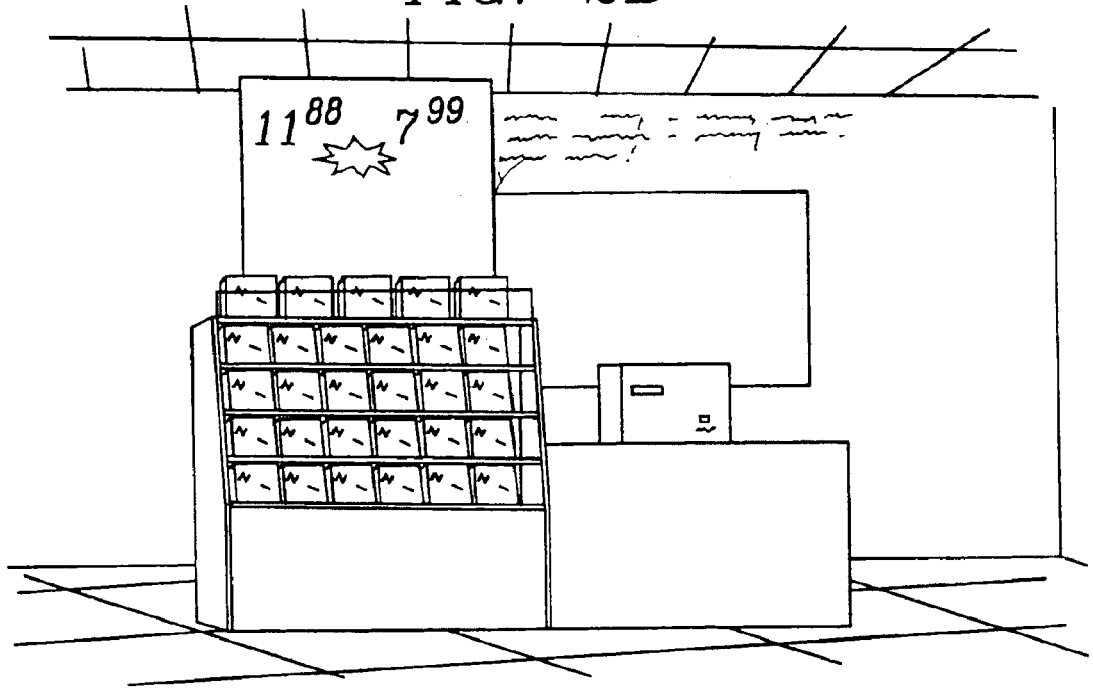
FIG. 2C is another view of one embodiment of an interactive endcap according to the present invention.
Figure 3:
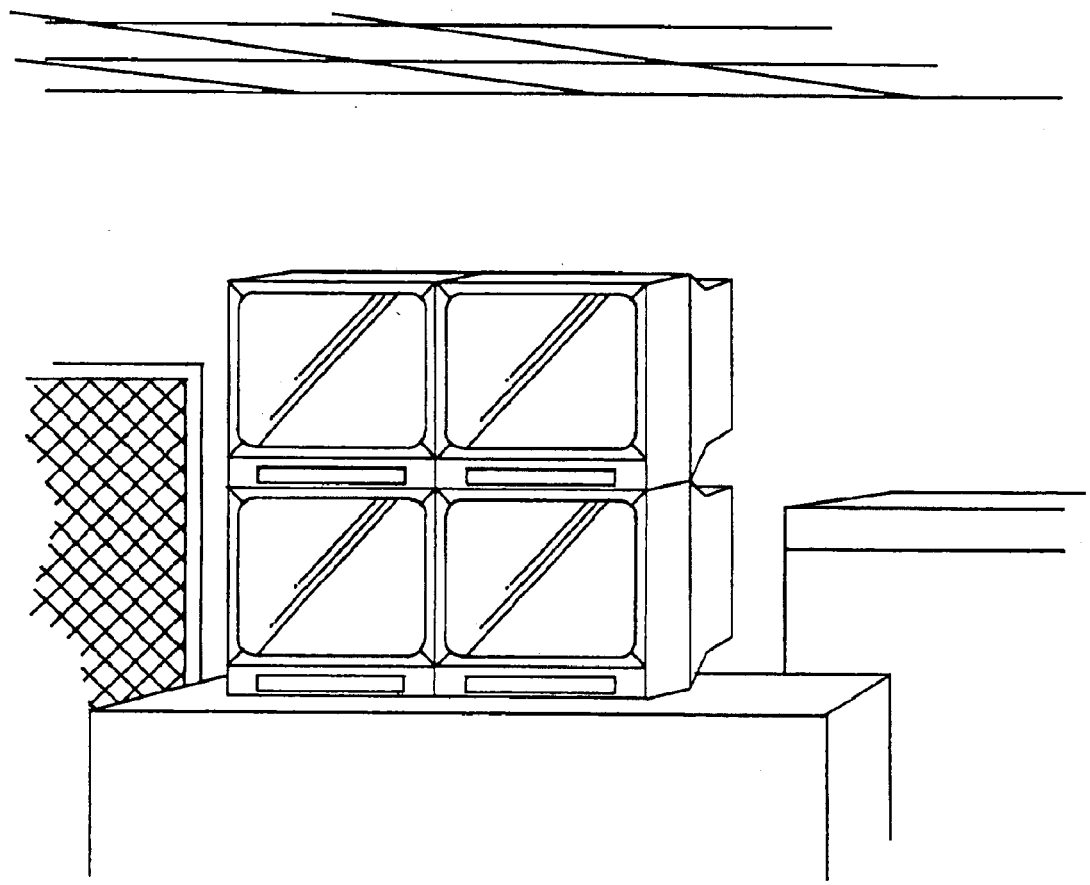
FIG. 3 is a view of a wall-of-eyes according to the present invention.

A digital department system (DDS) 100 illustrated in FIGS. 1A and 1B allows for the distribution of promotional and product content to one or more commercial sales outlets, such as a department store, convenience store, retail outlet, discount outlet, or other such location.

DDS 100 is a system employing a combination of software and hardware that provides cataloging, distribution, presentation, and usage tracking of music recordings, home video, product demonstrations, advertising content, and other such content, along with entertainment content, news, and similar consumer informational content in an in store setting. This content includes content presented in MPEG1 and MPEG2 video and audio stream format, although the present system should not be limited to using only those formats. Software for controlling the various elements of DDS 100 preferably runs in a 32 bit operating system using a windowing environment (e.g., MS-Windows™ or X-Windows operating system) and high-performance computing hardware. DDS 100 utilizes a distributed architecture (preferably a distributed three layer architecture) and provides centralized content management and distribution control via satellite (or other method, e.g., a wide-area network (WAN), the Internet, a series of microwave links, or a similar mechanism) and in store modules.

II. Content Providers

Content may be provided from an advertiser 102, a recording company 104, a movie studio 106 or another content provider, such as other content provider 108. Advertiser 102 can be a product manufacturer, a service provider, an advertising company representing a manufacturer or service provider, or other entity. Advertising content from advertiser 102 consists of audiovisual content including commercials, "info-mercials", product demonstrations, and the like.

Recording company 104 is a record label, music publisher, licensing/publishing entity (e.g., BMI or ASCAP), individual artist, or other such source of music related content. Recording company 104 provides audiovisual content such as music clips (short segments of recorded music), music video clips, and the like. Movie studio 106 is a movie studio, film production company, publicist, or other source related to the film industry. Movie studio 106 provides movie clips, pre recorded interviews with actors and actresses, movie reviews, "behind-the-scenes" presentations, and similar content.

Other content provider 108 can be any other provider of audiovisual content that can be displayed automatically or in response to a request by a customer. For example, other content provider 108 could be a computer software company such as a game software company, a business software company, or other such software manufacturer. Other content provider 108 provides audiovisual content depicting a demonstration of the software by a user, a "canned" (i.e., preset) demonstration of the company's software, an operating demonstration version of the software, or similar audiovisual content.

III. Network Management Center

Content is preferably procured by the entity operating a network management center 110 (NMC 110) via traditional recorded media (tapes, CD's, videos, and the like). Content provided to NMC 110 is compiled into a form suitable for distribution to and display at the commercial sales outlets being supplied. This normally includes using audiovisual clips provided by the various sources and editing-down the full-length content that may also be provided by those sources.

NMC 110 maintains a catalog (database) of products for preview. NMC 110, in accumulating and compiling this information, also digitizes this information and provides it to a Network Operations Center (NOC) 120 in the form of digitized data files 122. It will be noted that data files 122, although referred to in terms of digitized audiovisual content, can also be streaming audio, streaming video, or other such information. Each product may have associated digital files containing information pertaining to the product. Alternatively, all the information may be compiled into one file. Following are examples of the types of files/information that may be catalogued and maintained:

Video clips (music video, movie clip, product demonstration, and the like)
Liner notes
Date for broadcast
Audio clips
Song titles
Region for broadcast
Graphics
Album/artist info
Date to delete The NMC system also has the capability of maintaining a catalog of sponsor information that has been stored as digital files. The following are examples of the types of files that can be cataloged and maintained, although the types of files that may be catalogued should not be limited to the following:

Sponsor commercials
Sponsor bumpers
Sponsor graphics

Finally, NMC 110 is capable of maintaining a catalog of items stored as digital files that do not specifically pertain to a product or sponsor. An example of such items would be attract videos. Attract videos are general promotional, informational, or entertainment videos that are intended to attract a consumer's attention while they are shopping, in order to increase the likelihood of their utilizing the system.

All files are preferably named so that they are uniquely identifiable. For example, the file names for products can be based on that product's UPC code, which uniquely identifies that particular product within the system. A software module may be used to assemble the applicable file names for a content update into a script to be delivered with the update. This would support transmission schemes such as packaged delivery (using, for example, compressed files, files stored using a UNIX tar command, or the like). Of course, files may also be sent separately.

In order to update the content of a site or group of sites, at least the following information is preferably maintained for each site:

Site identifier
Network addresses of on-site devices
Routing protocol

Software, as described in commonly-owned U.S. patent application Ser. No. 09/130,998 is used to categorize, name, and catalog content at NMC 110. This function is referred to herein as content cataloging and scripting. This function is used by NMC 110 to manage content and create scripts for in store playback. These may be integrated into the existing management system. The distribution software may be configured to expect this function to be performed by the operator of NMC 110. The functions provided preferably include at least the following capabilities:

The ability to catalog titles by UPC and type as well as related content
The ability to define and specify groups and date ranges for where and when content is active
The ability to define a scripted play list for video bumpers, attract loops, and the Wall-of-eyes (described subsequently)
The ability to view/edit/delete/copy scripts Data elements listed below are referenced by the distribution module when compiling a distribution. The data elements that represent changes to existing tables can be added to current screen layouts for user data entry. The DDS system's flexibility allows new tables and the required additional screens to be developed by the NMC's operator, and then integrated into the DDS system.

The system has the ability to track titles (CD's, videos, general merchandise, software (including CD ROMs), and other such products) and the cataloging/inventory information associated with them. Preferably, information be provided for each title that specifies the groups in which stores are located for distribution of appropriate titles is supplied to DDS 100. Additionally, DDS 100 preferably receives information specifying the location of content files and script definitions that define the graphical behavior of the endcap unit (s) during attract modes and when titles are scanned. Other information preferably supplied to the DDS system includes, but is not limited to: data specifying text and graphic overlays for titles during video and audio playback, text strings (or other display data) that are to be used in the endcap attract mode, and endcap settings during audio playback.

The user interface includes several screens. The screens for user data entry of data elements used by the distribution module include, but are not limited to those listed in Table 1.

TABLE 1

DATA ENTRY SCREENS FOR THE DISTRIBUTION MODULE.

| Screen | Explanation |
| --- | --- |
| Groups | Screen for data entry of groups that are used to group stores |
| Store Groups | Screen for user to associate stores with defined groups |
| Button Groups | Screen for user to associate buttons (titles) with defined groups |
| Video Text | Screen for data entry of text overlays of video clips |
| Audio Text | Screen for data entry of text overlays during CD audio playback |

TABLE 1-continued

DATA ENTRY SCREENS FOR THE DISTRIBUTION MODULE.

| Screen | Explanation |
| --- | --- |
| Video Icons | Screen for data entry of graphic overlays of video clips |
| Audio Icons | Screen for data entry of graphic overlays during CD audio playback |
| Script | Screen for data entry of script definitions |
| Attract Script | Screen for data entry of attract mode portion of a script definition |
| Scan Script | Screen for data entry of user-scan portion of a script definition |
| LCD Text | Screen for data entry of LCD text strings in a script definition |
| Bumper Exclusion | Screen for data entry of bumpers to be excluded for certain videos in a script definition |
| Audio Settings | Screen for data entry of endcap settings during audio playback |

The distribution and delivery module is the software module used at NMC 110 to create distributions destined for stores. The computing platform used by NMC 110 is preferably a high-performance PC-compatible desk-top system (e.g., Windows 95™, Windows NT 4.0™, LINUX™, or other operating system running on a PC-compatible computer having at least 16 MB RAM). The module's source code is compiled into an executable, and may be written in any suitable computer language, although the C++ computer language is preferable.

The functionality provided by this module preferably includes, but is not limited to:

The ability to create a distribution pack or a set of content from the existing NMC cataloging system The ability to package and assign a distribution pack to be sent to a store or a group of stores The ability to verify the integrity of a distribution by scanning for the existence of referenced files The ability to send via FTP the distribution files to NOC 120

The ability to graphically display transmission information

The ability to log transmissions of distributions

The ability to view the transmission logs

The Database module manipulates the NMC database as well as the 'Distributions' table described below, among other data. Information used by this module includes, but is not limited to, data regarding the UPC code, the site groups, the UPC groups, the related video materials (if any), the related audio materials (if any), and additional information, as needed, which is described further in commonly-owned U.S. patent application Ser. No. 09/130,998.

The interface of this software consists of a main screen with a grid layout of existing distribution records and a mechanism to define and schedule new distributions. For example, in order to generate a new distribution, the user can specify some or all of the following:

A target group name from the 'Groups' table.

A date when the distribution is to be sent.

A blank date will specify ASAP status.

A beginning and ending date range from which to select titles to be distributed and/or removed from a current distribution.

A script definition identifier.

FTP address and directory or local directory for distribution and envelope files to be transferred.

Once a distribution has been defined by user, a record in the 'Distributions' table is made and the following events occur. First, a distribution set is created. The system can perform a relational join between the relevant tables and execute a query for title/content identifiers (e.g., UPC code) that match the group and date range specified in the 'Distributions' table. This set of identifiers is referred to as the 'pending distribution set' and is copied into a new generated table that identified using the associated distribution identifier from the 'Distributions' table. This table is then a record of the content that is to be included in distribution according to the user parameters stored in the 'Distribution' record. The filename and path of this table is stored in the 'Distribution' record. Preferably, the system removes these files automatically when they are no longer needed.

Next, one or more difference sets are created. For each store in the targeted group, the pending distribution set table is compared to the store's current distribution set table and a result difference set is generated. This set represents only the differences between the current and pending distribution sets and is copied into a temporary table that is preferably identified in part by either the group name for the targeted group or the store identifier of the targeted store. This set is preferably the same for all the stores in a group, except in the case where a store has been recently added or moved to a group where it has a different current distribution set than other stores in the group. In such a case, a separate difference set is created for each newly added store in the group, with the file name reflecting the store's identifier.

Next, one or more distribution package(s) are created. Using the information in the difference table, the system will then perform several actions, preferably including at least the following:

Searching for and compiling the binary content files associated into a temporary directory structure that will mirror the in store directory structure.

Creating necessary files used for textual information, including, for example: UPC.INI—where UPC is the UPC code of the CD title. This file is required for the listening post for LCD text data when playing audio only CD's. LPx.INI—where x is the listening post number. This file is used for attract mode LCD text.

Storing files in the directories as they appear on the target machine. The system creates in temporary storage the directory and file structure as it appears on the in store target machines and copy content to the appropriate locations.

Compressing the content files, including directory information into separate compressed files, one for each type of target in store machine.

Compressing the collection of separate compressed files into a master compressed file along with an information file on the directions for uncompression.

Creating a satellite attributes (envelope) file using the group defined in the 'Distribution' record's 'Group_Name' field in order to compile a list of store addresses to include in the envelope file.

Transmitting the file(s) by copying the files to temporary storage area where the sender module sends the files for transmission.

Receiving acknowledgment from the sites receiving the content. The system waits for a given time interval and collects acknowledgments from each recipient. Also performed is error checking, during which NMC 110 is notified of any packages that weren't sent or received. This mechanism may be effected via the transfer of acknowledgment files.

The envelope format contains several fields that define behaviors of package distributions. The various modules that handle packages in the envelope format may contain registry entries for these settings and may refer to them when assembling the envelope file. Once a file is transferred successfully to NOC 120, the 'Sent_Date' field of the 'Distributions' table can then be updated and the temporary data deleted.

Thus, the software can be used create 'distribution packs' that targeted to specific store sites and delivered to one or more stores on a scheduled or on demand basis. The distribution packs, if used, contain content that is intended to either replace or enhance existing content already present on site (unless the site's system is being initialized for the first time, in which case the packages delivered will for the basis of the site's initial content). Alternatively, the files may be compressed and transferred separately, or a streaming compression program of some type employed.

IV. Network Operations Center

Using the file compression approach mentioned above, the new content and script is compressed into a single file. The compressed file, along with the above site information for each affected store, is then transmitted to NOC 120, which may be a satellite communications center, an ISP on the Internet, a WAN hub, or other such central location. Optionally, the information may be distributed directly from NMC 110. Sites with identical content updates can be designated as groups (regions), if, for example, multiple file transfer protocol (MFTP) sessions or multicasting is used.

As will be apparent to one of skill in the art, in fact, several methods for distributing the information via satellite exists. Among these are internet protocol (IP) multicasting, switched multimegabit data service (SMDS), WAN protocols, internet group management protocol (IGMP), and Starburst™ multicasting (Multicast FTP™). These methods support the broadcasting or multicasting of promotional content to the commercial sales outlets.

One example of a multicasting technique is the Multicast File Transfer Protocol (MFTP) from Starburst™. This protocol is described in great detail in the draft specification entitle "Starburst Multicast File Transfer Protocol (MFTP) Specification," (filename: draft-miller-mftp-spec-03.txt; dated April, 1998) which can be viewed at the time of this writing at the following universal resource locator (URL) on the World Wide Web:

http://www.globecom.net/ietf/draft/draft-miller-mftp-spec-03.html, which draft specification is incorporated herein by reference in its entirety and for all purposes. File Transfer Protocols (FTP) are the workhorse file transfer protocol associated with the TCP/IP protocol suite. FTP is the file transfer application used for pulling documents off of the Internet, for example. FTP runs on top of the TCP transport layer. FTP relies on TCP for reliable delivery of data, as TCP provides connection oriented service. This means acknowledged error correction of data transmissions and guaranteed ordering of frames. Connection-oriented transport protocols set up virtual circuits, where the virtual circuit makes the connection look like a physical circuit for the duration of setup. TCP, like many other error correcting protocols, corrects data on the fly based on the concept of sliding windows. The transmitter sends out a window worth of data before requiring an acknowledgment. For maximal efficiency, the window size (i.e. the time to send out a window worth of data) should match the round trip network delay. If this matches, the transmitter will not have to wait for acknowledgments but can continue to send data continuously.

TCP uses dynamic windowing, where the window size is calculated and set dynamically based on measurements of round trip delay and other parameters such as receive buffer size. However, the delays incurred in satellite data networks can be beyond the limit of window size, especially at high transmit rates, resulting in transfer inefficiency. FTP requires the setup of two TCP virtual circuits, one for control and one for the actual data transfer. The control virtual circuit is used for logging in and setup of the file transfer, with the other used strictly for data transfer. Hosts with multitasking operating systems, such as UNIX workstations; can have multiple FTP connections simultaneously to multiple sites allowing files to be sent to multiple sites concurrently.

A file transfer service in the TCP/IP suite that operates on top of UDP is the Trivial File Transfer Protocol, TFTP. TFTP was designed to be a very simple alternative to FTP, and was conceived to be so simple it could be implemented in a ROM. One big usage originally envisioned was for machine boot of software at startup. UDP provides a simple datagram service for transport. No error correction is provided, although error checking is done, with bad packets simply dropped. Packets may be delivered out of order. Thus, TFTP must provide the error control at the application layer to make sure that the file is transferred error free.

TFTP operates with a window of one with a fixed application layer message of 512 bytes. This means that every 512 bytes of transmission requires receipt of an acknowledgment before the transmitter can proceed to the next 512 bytes to be sent in the file. Window of one protocols work reasonably well when there is little round trip delay in the network, for example on a LAN. But if there is significant delay relative to the time to send a message, efficiency suffers greatly because the transmitter has to wait a high proportion of the time for acknowledgments.

Another file transfer protocol is based on the Multicast File Transfer Protocol (MFTP). MFTP operates over UDP in the TCP/IP protocol suite. An explicit transmit rate is settable, allowing a known amount of bandwidth to be reserved for other applications. The protocol is efficient, with little performance degradation due to delays over satellite or wireless networks. MFTP is designed for multicast and broadcast usage over data networks of all sorts including wireline and wireless WANs, and in other scenarios where multicast and broadcast services are becoming available.

There are three basic entities defined in the MFTP protocol; the frame, which is a link layer entity and has the same meaning for MFTP as for other protocols, the block which consists of a number of frames, usually hundreds or possibly even thousands, and a pass, which consists of transmission of the whole file on the first pass, and missing pieces on subsequent passes. Clients are obliged to send acknowledgments about the previous block at block boundaries. A selective reject negative acknowledgment indicates those frames within the block that are missing or in error.

An MFTP transmitter does not stop and wait for acknowledgments before continuing transmission. Rather, it transmits continuously until the whole file has been transmitted, at which point it sends another "pass" consisting of only those frames that were negatively acknowledged. A third or fourth pass may be required to complete error free transmission to all clients. The concepts of not stopping and multiple passes results in acceptable file transfer efficiency. The transmitter is transmitting the file virtually all of the time so that higher speeds can be used than might otherwise be possible only bad frames are resent. Performance tends to be independent of network round trip delay, which is important for high speed wireline, satellite, and CDPD wireless infrastructures. Multicast as well as unicast service is available when using MFRP.

MFTP has the additional capability to dynamically set up and tear down groups and add and delete members of a group to which a file is to be transferred. This capability provides a high level of flexibility and convenience to the user. Dynamic groups capability is able to operate in two different network environments; multicast IP for routed networks, and multicast frame relay or multicast SMDS for bridged environments. In the latter case, the group is set up totally in the application layer under control of MFTP. In routed networks, the routers route based on the location of members of the group using the IGMP protocol described in RFC1112, which is included herein by reference, in its entirety and for all purposes.

V. Communications Network

NOC 120 communicates digitized data files 122 to a commercial sales outlet 130 via a communications network 125. Communications network 125 can be implemented in any one of several technologies. For example, a satellite link can be used to distribute digitized data files 122 to commercial sales outlet 130, as described below. This allows content to easily be distributed by broadcasting (or multicasting) the content to various locations. However, any response by the systems are those locations must be accomplished in some other manner, such as by leased line, public telephone line, the Internet, or some other comparable mechanism.

Alternatively, the Internet can be used to both distribute audiovisual content to and allow feedback from commercial sales outlet 130. Other ways of implementing communications network 125, such as using leased lines, a microwave network, or other such mechanisms, will be apparent to one skilled in the art.

As an example, FIG. 1A depicts communications network 125 as a satellite link that includes a transmitting station 121, a satellite 127, and a receiving station 128 at commercial sales outlet 130. Also at commercial sales outlet 130 is a receiver/decoder 135. Digital data files 122 are sent by NOC 120 via transmitting station 121 to satellite 127, which then broadcasts this information to various locations, such as commercial sales outlets (exemplified by commercial sales outlet 130). These commercial sales outlets receive this information via satellite receiving systems, such as receiving station 128. The digitized information is then provided to receiver/decoder 135 which then distributes this information to various points in commercial sales outlet 130.

Receiver/decoder 135 is capable of receiving, processing, and providing voice, video, data, and other forms of information to various devices within commercial sales outlet 130. While the configuration of the communications network 125 (and in particular, transmitting station 121, receiving station 128, and receiver/decoder 135) will vary according to the technology used to distribute digital data files 122. For example, while transmitting station 121 and receiving station 128 are described in terms of a satellite network, one of skill in the art will recognize that these elements could support broadcast or duplex communications systems. These elements could therefore be satellite transmitters/receiver pairs, a multicast network, a UUCP (Unix-to-Unix CoPy) network, or the like. Alternatively, these elements could be network interface cards, microwave transceivers, infrared transceivers, or the like. In this example, a satellite broadcasting system is employed. Transmitting station 121 and satellite 127 are implemented using commercially available satellite communication technology, and so are not described in detail herein.

Receiving station 128 and receiver/decoder 135 may also be of any conventional design, but are preferably implemented using satellite technology that lends itself to ease of installation and operation such as that available from Hughes Networking Systems, Inc., or DigitalXpress. An example of a satellite broadcast solution is the Receive-only Earth Station (RES™) system, by Hughes Network Systems, offers a flexible and cost effective means of receiving data broadcast by satellite. In this configuration, receiving station 128 and receiver/decoder 135 simply receive data files 122. Responses to NMC 110, reporting of broadcast errors, reporting of system integrity, reporting of consumer information, and the like are by telephone or leased lines (not shown), or other mechanism. Thus, the focus in this type of system is the provision of data files 122 to the remote sites.

The RES™ system is a satellite-based digital data receiver supports the distribution of high volumes of data in a data broadcasting environment. The RES™ design has an L-band receive interface and supports fine tuning in 1 kHz steps. The RES™ system thus provides reliable and efficient satellite data reception.

The RES™ package includes a low noise block downconverter (LNB), an interfacility link (IFL), and an indoor unit (IDU). The LNB, which can be easily integrated with a variety of receive-only antennas, downconverts the RFC- or Ku-band signal to L-band. The L band signals are sent to the IDU via the IFL. The entire IDU, housed in a space efficient set-top box, demodulates and decodes the signal. The RES™ system is an elegant and self-contained set-top unit, and is able to operate in a variety of environments.

The RES™ system is configured and controlled by means of software running on a personal computer, workstation, "dumb" terminal, or the like. The software enables the operator to set the unit's operational parameters. Thus, by software selecting system features such as the data rate, modulation type, and coding type, network flexibility is obtained. The software also maintains a check on the status of the RES™ system. Status information available includes, but is not limited to:

User data rate

Modulation type

FEC type

Receive frequency and offset, and other receiver parameters

The RES™ system's functional modes include the following four modes. During the idle mode, the RES™ system is quiescent, awaiting commands. During the acquisition mode, the RES™ system is actively searching for a receive signal in a region around an assigned frequency. During the tracking mode, the RES™ system is tracking, demodulating, and sending data to the user's system (e.g., a multimedia server 160 in commercial sales outlet 130). During the fade mode, the RES™ system has recognized a faded signal condition and is waiting for signal conditions to improve before resuming tracking mode, or until it times out and returns to acquisition mode. The RES™ system supports the demodulation of signals modulated using quadrature phase-shift keying (QPSK)~ or binary phase-shift keying (BPSK) at data rates of between about 64 kbps and 2.048 Mbps in multiples of 64 kbps (including 1.544 Mbps). The data rate used is software selectable. The data interface provided is, for example, an RS-422 interface, although other interface specifications can easily be met using the given hardware. Error coding can be, for example, Viterbi decoding (e.g., K=7 in R ½ and R ¾).

Another example of a satellite broadcast system is the Gemini Earth Station (GES™) from Hughes Network Systems, Inc. (HNS), which combines the HNS 9100 Universal Modem (UMOD) with a reliable and economical outdoor unit (ODU). The ODU unit employs an integrated architecture that provides high-performance at reasonable cost. The GES™ is used in point-to-point (unicast) and point to multipoint networks. The GES™ offers the following advantages over conventional systems:

- Low-cost VSAT stations
- High reliability
- Good performance and versatility
- Single interfacility link (IFL) cable
- Easy operation and maintenance
- The remote RF equipment can be controlled from inside the site
- Simplified aiming of the antenna that requires only a voltmeter
- Integrates with other HNS products such as the Personal Earth Station™ (PES™, discussed infra) and the RES™ system (discussed supra)
- Local and remote monitor and control capabilities The GES™ can be configured to operate in satellite bands such as the C-band and Ku-band. The station includes an indoor unit (IDU), an ODU, IFL, and antenna. The IDU consists of an HNS UMOD and an RF interface module (RFM). The 70 MHz intermediate frequency (IF) output of the UMOD interfaces with the RFM to convert the IF signals (transmit/receive) for use by the ODU. The RFM board also contains a multiplexer to combine all power, control, and transmit/receive signals onto a single IFL cable.

The universal modem can accommodate quadrature phase-shift keying (BPSK) or binary phase-shift keying (BPSK), although one of skill in the art could easily envision other modulation schemes that could successfully be used in this system. A Viterbi, sequential decoding scheme is used for forward error correction, with coding rates of ½, ¾, or 1 (i.e., no coding). Data rates supported by the system range from about 9.6 kbps to about 8.448 Mbps, and are preferably controlled in 1 bps steps. Data interfaces that the GES supports includes RS-232, RS-449, V.35, and G.703, although other formats can easily be accommodated in such a system.

The system may be monitored and controlled in several ways, such as by a front panel keypad and display, or by a terminal interface command set (e.g., for use with a "dumb" terminal). Other monitor and control interfaces can easily be devised, such as a graphical user interface (GUI)monitor and control system software. Optionally, a Viterbi/Reed Solomon concatenated codec may be employed for improved bit error rate (BER).

An example of a satellite system capable of supporting two way satellite communications is the Personal Earth Station™ (PES™) from HNS. This system provides a low-cost, high capability satellite communications system. The system is part of a private satellite network that supports two-way data, voice, multimedia, and one way broadcast video and data communications between an NOC and remote sites.

A PES™ system is located at each remote site on the network, providing communications with NOC 120. NOC 120 may be, for example, a hub station located at a user's headquarters or data center or an HNS operated "shared hub." The PES™ system effectively supports data intensive applications and, at the same time, provides fast response times for interactive applications. Capacity is allocated to remote sites on demand, providing optimum response times for remote applications.

The PES™ network is made up of two components: an outdoor unit (ODU) and a digital indoor unit (DIU). The ODU is a small antenna with an antenna-mounted radio frequency (RF) unit that enables the transmission of signals originating at the remote site and the reception of signals originating from the hub. Functions performed by the ODU include signal reception and downconversion to intermediate frequencies, and signal transmission and upconversion to radio frequencies. The size of the antenna depends on the data rates used and the satellite coverage available. The ODU is installed at the remote site, typically on a non-penetrating mount secured by ballast on the roof of the remote site.

The DIU converts signals to and from baseband frequencies and provides interfaces to user equipment. The standard DIU is provided with two ports. Additional interfaces are available through a variety of expansion options. Multiple protocols are supported enabling interfaces to a variety of data processing and computer equipment. Video is transmitted independently of data and voice. The DIU is attached to the ODU through a single IFL cable.

This system can operate, for example, at frequencies in the Ku band, the C band, and other satellite bands, at various data rates. Asynchronous data rates are supported up to 19.2 kbps, while synchronous data rates of between about 1.2 kbps and 64 kbps, at standard data rates, are supported. Interfaces supported include data interfaces, LAN interfaces, voice interfaces, and video interfaces, such as RS-232, RS-422, V.35, RS-530, Ethernet (UTP, coaxial), Token Ring (Type 1, Type 3), RJ-11 (two-wire loop start or four-wire E&M). Protocols supported by the PES™ system include, but are not limited to, Ethernet (10 Mbps), Token Ring (4/16 Mbps), SDLC (PU4-PU2, PU4-PU4), SDLC-to-Token-Ring, X.25, BSC 3270, TINET, Bit and Byte Transparent, HASP, Frame Transparent, X.3/X.28 PAD, Broadcast, and other, more specialized protocols.

Alternatively, a system such as that manufactured by DigitalXpress may be used in implementing receiving station 128 and receiver/decoder 135. One system from DigitalXpress includes an antenna kit and a receiver. The antenna kit consists of a 36" reflector, a non penetrating roof mount, and Ku-band (11.7 to 12.2 GHz) LNB (low noise block downconverter). The antenna is easily aligned and is secured via the mount to the roof with ballast. The antenna receives linearly polarized signals from the DigitalXpress transponder on the SBS-6 satellite located at 74 degrees west longitude. The LNB is located at the focal point of the Ku band antenna, receives power from the DigitalXpress digital satellite receiver and generates an L-band (950 to 1450 MHz) RF signal which is routed to the satellite receiver via an RG-6 coaxial cable. The antenna has a frequency range of between about 10.95 GHz and 12.75 Ghz. Also offered is a 1.2 m antenna with similar characteristics.

The DigitalXpress receiver is a tabletop, VCR sized component that connects via coax cable to the LNB and antenna. The receiver has the following outputs:

- S Video
- Modulated Channel ¾ TV
- Stereo Audio
- Wideband Data Port
- RS-232 Port
- RJ-11 Telephone Port
- RS-422 High Speed Data Port These outputs are similar to those of a VCR, with the exception of the Wideband Data, Telephone, and RS-232 ports, which are used for data applications. The receiver kit also includes a security system utilizing an access card. This credit card sized device contains active electronics, and employs a verification system that allows only authorized users to decrypt video and computer data.

VI. Digital Department System™ On-Site Network

Receiver/decoder 135 is preferably capable of receiving both digital and analog information. With regard to data reception and distribution, receiver/decoder 135 is connected to various network nodes in commercial sales outlet 130 via a network system 150. Network 150, while it may be directly connected to various other nodes in commercial sales outlet 130 is connected in FIG. 1B to multimedia server 160, as noted. For most of data files 122, once they are received by receiving station 128 at commercial sales outlet 130, they, are passed to receiver/decoder 135, which in turn passes them on to multimedia server 160. Multimedia server 160 is connected via the network (e.g., an ether network using a TCP/IP protocol stack, and using FTP file transfers to distribute the promotional information) to various nodes in commercial sales outlet 130. These nodes include (but are not limited to) an in-line home video station 161, an in-line computer hardware and software interactive display 165, an in store radio system 170, a wall-of-eyes 180 (which may be connected to either multimedia server 160, or to receiver/decoder 135 via a video switch 175, which is optional), listening posts 185, audio/video endcaps 190, audio/video endcaps in other departments 195, on-line services 200 and an entity LAN 210. Entity LAN 210 may be connected to an on-line internet commerce access system 220, a UNIX server 230 and/or a CBL server 240, among other such possible connections.

Preferably, each site (as represented by commercial sales outlet 130) houses a multimedia server (represented in FIG. 1B by multimedia server 160). Each multimedia server is capable of receiving distribution packs and, accordingly, distribute them in store. Interactive Endcaps are capable of storing their own content and receiving content when distribution packs are received optionally, other audio content may be served on demand from multimedia server 160 to the requesting listening post or audio/video endcaps 190. Additionally, multimedia server 160 is capable of driving wall-of-eyes 180 as a separate sub system. Content intended for wall-of-eyes 180 may be included in a distribution pack (or sent separately) and may be hardware pre empted when a live video feed is presented via video switch 175. DDS 100 is capable of gathering user usage statistics and performing periodic diagnostic checks on itself and audio/video endcaps 190. Gathered information may be sent by the DDS server to NMC 110 on a scheduled or on demand basis (e.g., via an FTP backchannel communication). Optionally, multimedia server 160 may also provide certain in store management functions.

VII. Multimedia Server Operation

Software (not illustrated) residing on multimedia server 160 provides operational and database functions to support the distribution of promotional content and the gathering of system and customer statistics. This software is described in great detail in commonly-owned U.S. Pat. No. 6,366,914, but is described here briefly for completeness.

Multimedia server 160 is a computer (preferably, a PC-compatible computer) that preferably runs one or more of the following software packages:

DDS distribution receipt module
    DDS maintenance module
    Endcap Log Server
    TCP/IP and FTP network services (or software providing comparable functionality)
    HTTP services
    Wall-of-eyes Script Module
    IP Multicast Software (or software providing comparable functionality)

On or more of the above software modules, aside from the distribution receipt module, are preferably loaded either as services or are run as background tasks. The wall-of-eyes script module is normally the focused foreground application and so should have CPU priority. The server preferably has network access to the endcap stations through network file services. Access to the listening posts may be, for example, through TCP level communication. The software on multimedia server 160 provides the functionality required to manage content, allow the previewing of content, maintain system and consumer statistics, and the like.

One of the modules needed to implement the DSS system on site is a satellite receiver communications module. Multimedia server 160 will periodically receive data from NOC 120. This may be via a satellite receiver at commercial sales outlet 130 (as shown in FIGS. 1A and 1B), or may be by some other method, such as a wide-area network (WAN), an Internet connection (either by independent service provider (ISP) or leased line), or other method. The data will generally be contained in a ZIP file, alone with instructions regarding the directory into which it needs to be unZIPped. Alternatively, the files may be sent uncompressed, or sent separately, or packaged using a UNIX tar command or equivalent, or by another method.

Via an NMC communications module, multimedia server 160 preferably provides the ability to contact (via modem or other communications functionality) NMC 110. Alternatively, other communication methods may be used, such as a two way communications system (e.g., WAN, Internet, and the like). For example, the Personal Earth Station™ from HNS might be employed as described previously. Multimedia server 160 may contact NMC 110 either on a scheduled basis or an event triggered basis. An example of a scheduled dial up could be to report daily usage statistics. An example of an event triggered dial up could be a diagnostic failure.

Also provided is a data routing module. On a regularly scheduled basis, multimedia server 160 may be configured to search a pre determined list of directories for the existence of new files or new versions of files. If new files are found, they may be sent to a network address associated with the directory in which they are found.

Also provided is a boot-up module. When the multimedia server boots up, it preferably commences normal server boot-up functions. Preferably, the boot-up module also checks for evidence of a previous abnormal shutdowns. This may include invoking the data routing module.

Also provided is a management module. The management module has the capability of providing store management with the ability to log on to the multimedia server as a user with limited access to make modifications to pre-defined files. An example would be to create or modify a text file containing a promotional message for a featured product.

Also provided is a distribution recipient and router module. The distribution recipient and router module is preferably started by the satellite communications module when a file (e.g., one or more of data files 122) has been received and is ready for distribution. The file transferred may be passed on the command line, or provided in another manner (e.g., by an operator). Functionality provided by this modules includes, but is not limited to the following:

The ability to de compress distribution packs
    The ability to determine from setup.ini file where files are to be decompressed to The ability to route appropriate portions of distribution packs to addressed Interactive Endcaps The ability to log the reception and routing of distribution packs The ability to view the distribution logs The ability to provide acknowledgment of packages directly to the NMC OPERATOR through direct FTP.

Any manner of user interface display may be employed, but preferably a main window with a grid displaying distribution data log records for each distribution is presented to the user. No interface is displayed when launched with a command line file argument. This module receives the filename of the distribution file on the command line when launched. After the file is located, the following operations can be performed:

File decompression into the temporary directory into individual compressed files Parsing the setup file to determine the source files and destinations.

Recursive decompression of files into the appropriate destination directories

Removal of temporary and original download files is then performed

A log file record may be generated in the log file

Optionally, if a "delete" file is included in any of the individual files, those UPC's and files may be removed from the corresponding system(s). The multimedia server should have network access to the nodes referenced in the destinations. Otherwise, an error may occur and a distribution pack may not be successfully sent.

The purpose of the wall-of-eyes script module is to execute video playback scripts for wall-of-eyes 180. Functionality provided by this modules includes, but is not limited to the following:

The ability to read the scripts designated for wall-of-eyes 180

The ability to play and output to wall-of-eyes 180

This module may be provided with only a consumer interface, or may provide other interface functionality.

The video content (preferably MPEG-2 encoded and with no text or graphics overlay information accompanying same) is made available from, for example, data files 122 received by multimedia server 160. Content may be stored locally (on multimedia server 160) or remotely (at NMC 110, NOC 120, or on one of the nodes on network 150).

A maintenance module is provided to gather statistics on user usage. Listening posts (or other network nodes) gather daily statistics, and the module periodically gathers such data into a table and cleans out directories containing older versions of such information. A statistics file may be maintained for each one of listening posts 185, at one or more of listening posts 185, at one or more of audio/video endcaps 190, on multimedia server 160, at another of the many nodes connected to network 150, or at a remote location (e.g., NMC 110 or NOC 120). Following are examples of the data that may be logged for each network node (or groups of nodes, or for only one node) on a daily (or weekly, monthly, or other) basis, using a music CD selection as an example:

Number of scans per product

Number of times a song is accessed by the FWD button

Number of times a song is accessed by the REV button

Number of times a song plays by default

All UPC codes not recognized by system

The system is also capable of scanning these and other in store systems for possible errors and reporting them to NMC 110. On a regularly scheduled basis, multimedia server 160 preferably performs self diagnostics, as well as polls listening posts 185 and audio/video endcaps (e.g., audio/video endcaps 190) for diagnostic status, such as alive and well, low disk space, etc. Signal quality (impedance check) of wall-of-eyes 180 and other system checks may also be performed. If an anomaly is found, the NMC communications module can be invoked to report the problem to NMC 110 so that appropriate action(s) may be taken.

Functionality provided by this modules includes, but is not limited to the following:

The ability to gather and catalog daily statistics files created by listening posts The ability to gather and catalog daily statistics files created by audio/video endcaps The ability to refresh statistics directories The ability to scan server disk for low disk space The ability to ping and scan interactive endcaps for low disk space This module will normally be loaded at all times in multimedia server 160. At a pre defined interval, usually at an off peak time, the system preferably:

Gathers ".log" files from the listening post directories in an area on multimedia server 160 and removes them from the log area Copies the log files to the statistics destination directory Ping listening posts and endcaps to ensure they are "alive"

Scan endcaps (and local) drive space

Errors are reported to the SNMP agent running as a process in multimedia server 160 as a trap. Error thresholds are determined by stored settings.

The interactive endcap module provides the functionality required to support in-line home video station 161 and audio/video endcap 190 in allowing users to scan UPC codes of featured products (or otherwise identify other products of interest) and be presented with video and audio clips relating to the product's content, product demonstrations, or the like. This module communicates with a listening post module through a connection over network ISO. The interface for this module can, for example, allow one or more of the nodes connected to multimedia server 160 via network 150 to emulate a kiosk. Functionality provided by this module includes, but is not limited to the following (which are stated in terms of a CD music preview configuration):

The ability to receive a UPC scan interrupt.

The ability to play MPEG and video and audio content associated with a UPC according to a scan script.

The ability to respond to navigation button presses sent from the listening post module and respond accordingly.

The ability to read and play attract and bumper scripts

In this configuration, the module performs the following functions:

Play an attract mode based on the current script definition.

Perform TCP communications with the attached listening post device used as a scanning station to determine when a product is scanned and when buttons are pressed. Additionally, the software will have the ability to send text strings to the LCD panel on the listening post according to the attract script through this communication channel. The server based management module will also use this communications channel pause the system while updates are being made. When a UPC is scanned, play the scan script based on the current script definition.

Immediately display a product graphic and other information with any video content displayed.

When playing the title video, display any text and graphics overlays. If the consumer does not press the forward button to hear more songs, the system at video completion, will display a graphic informing the user that more audio tracks are available and prompting them to press the forward button.

When playing CD audio tracks, display a background with the album graphics and text overlays, including the audio titles, the currently selected track, and any prompts and sponsorship icons.

Video content (which has been defined as MPEG 1, although other formats may be employed) and other content is stored on the endcap units local storage using the directory and file naming conventions described elsewhere in this document.

A wall-of-eyes script module allows multimedia server 160 to interpret the script(s) associated with wall-of-eyes 180, which are discussed infra. For purposes of this discussion, a "wall-of-eyes" is a display using two or more TV's, monitors, flat panel displays, or other display devices. The purpose of the script is to control the content which is displayed on the wall-of-eyes. Following are examples of elements that may be controlled by the script, although the elements should not be limited to those listed:

Video clips displayed on wall-of-eyes 180

Video clip order and frequency

Video clip in/out date and time

Graphic overlays per clip

Text overlays per clip

For example, a continuous play, 2 hour, 3 non-interactive program can be displayed on wall-of-eyes 180, which may [be] done during some or all of the site's hours of operation. In one embodiment, a mix of existing entertainment programming (music videos, home video trailers, first run movie trailers, for example) are played. Original entertainment features (interviews, behind-the-scenes looks at movies/videos, specials on concert tours), sponsor advertising spots and commercial entity spots/information clips may also be displayed.

Preferably, video is delivered in MPEG-2 format, but other formats, and even uncompressed, standard video, may be used. The original entertainment features are preferably provided by outside suppliers (such as production studios). The different programming elements are preferably assembled at NMC 110 into one cohesive show (although this may be done at an off site location), and those elements bound together with short introductions, headlines, trivia segments, question and answer segments, commercial entity facts, station identifications, and the like, all created by the NMC operator (or other source), thereby creating a finished show image. One benefit of the present invention is the minimization of burn out/annoyance of outlet personnel constantly exposed to the content displayed. Repetition is kept to a minimum, while still meeting advertising objectives of advertisers.

Programming may employ the following exemplary guidelines of Table 2, although other scenarios will be apparent to those skilled in the art:

TABLE 2

EXEMPLARY PROGRAMMING GUIDELINES.

| Minutes of hour | Description |
| --- | --- |
| 17.5 | Music Videos: 5 videos per hour, 3.5 minutes each, non-repeating during the 2 hour show |
| 5 | Home Video Trailers: 5 trailers per hour, 1 minute each, non-repeating |
| 4 | Theatrical Movie Trailers: 2 trailers per hour, 2 minutes each, repeating once per hour |
| 9 | Corporate Sponsor Ads: 9 Sponsor advertisements per hour, :30 each, repeating twice per hour |
| 20 | Production studio TV content: 4 segments per hour, 5 minutes each, non-repeating |
| 3 | Announcements for commercial sales entity: 6 segments/hour, :30 each, repeating once per hour |
| 1.5 | Glue segments: 9 segments/hour, 10 seconds each, repeating once per hour |

Total running time for this example is 60 minutes. Content is preferably completely revised on a monthly basis with 25% of content changed every week. Preferably, whenever possible, multiple versions of repeating content, particularly sponsor announcements, are rotated within each hour and on a weekly basis.

Preferably, programming is scripted with separate files for each content element (handled by the wall-of-eyes script module). This allows for seamless changing of content pods at any time via the chosen communications method. Also preferably, there are several regionalized versions of each months program (the specific number of which can easily be configured). Each regionalized version emphasizes a different music genre (e.g., country, rock, alternative, and the like). Sponsorships may be changed between each of the versions, although that is not necessary sponsorships may be the same for all versions; any amount of the content may remain unchanged between the versions.

The program preferably has the capability to switch from prepared programming to delayed live feed programs (special events, messages from/interviews, and other live-action sources), with switching taking place at the level of the commercial sales outlet (using, for example, video switch 175) or at entity headquarters (NOC 120 or actual headquarters).

One of the primary functions of multimedia server 160 is the provision of content to nodes connected to network 150. These tasks are handled by an audio playback communications module. The following is an example of the functionality that can be provided by the audio playback communications module. When a barcode is scanned at a listening post, the UPC code is transmitted to the multimedia server via network 150. This is just one example of what can be done with such information, however. The information could be processed by computer of audio/video endcap 190, one of listening posts 185, another node on network 150, or a remote location (e.g., the NOC or NMC). The audio playback communications module "looks up" the UPC code and sends the data back to the requesting node, such as audio information for previewing a music CD:

Compressed audio file for the first track preview

Multiple lines of text associated with each UPC code (e.g., artist name, price)

Alternatively, the audio data may be streamed to the node using, for example, real time audio compression and transmission technology. This is also true for video data sent throughout this system. In the audio file example, when the FWD button is pressed, the current audio preview is interrupted and a subsequent audio file is sent to the listening post The number of times the FWD button generates anew audio preview is dependent upon the number of previews available for a given CD. If the FWD button is pressed during the last preview, a text string (or other data) will be sent to the listening post indicating that no more previews are available. This data may be displayed, for example, on an LCD display at the listening post.

If the REV button is pressed during any subsequent audio preview, the preview is interrupted and the previous audio file is sent to the listening post. If the REV button is pressed during the first audio preview, a text string (or other data) may be sent to the listening post (again, that may be displayed on an LCD display) instructing the consumer to push FWD for more previews. If an audio file completes playing uninterrupted, the subsequent audio file will be sent. This action may continue until all audio files for the scanned CD have played, or may be re run in an infinite loop. If a new CD is scanned during audio playback, the new UPC is processed, playback is interrupted and an audio file for the new CD is sent.

If a barcode is scanned and the UPC is not recognized by the multimedia server, a text string (or other data) is sent to the listening post for display, notifying the consumer that no previews are available for that barcode. If a CD barcode is scanned at the interactive endcap, and it is not a featured product (i.e., it has no video available), the endcap may be configured to emulate a listening post from the multimedia server's perspective in such a scenario.

VIII. Listening Post

Listening posts 185 permit users to preview audio clips from various recorded media, including CDs, albums, tapes, DAT tapes, and other recordings. Wall-of-eyes 180 and audio/video endcaps 190 can be used to allow customers to preview both prerecorded audio material and prerecorded video material, prior to purchase, based on selections made using one of listening posts 185. Similarly, audio/video endcaps in other departments 195 allow users to learn about various products either visually or audibly by inputting identifying information into the system. For example, a customer could use a keypad, mouse, trackball, or other input device to select from one of a number of displayed products to learn more about that product. Alternatively, a universal product code (UPC) scanner could be used to read the UPC off of the product when the user scans that product with a scanner. A benefit of this method is that the UPC is guaranteed to be unique. Once a UPC is scanned in, informational material stored either on the endcap or on multimedia server 160 may then be provided to the customer to inform them about the product. In the case of audio or video material, audio or video (or a combination thereof) is provided to the customer to acquaint them with the selection they have chosen. For example, audio clips may be played at listening posts 185 and/or audio/video endcaps 190 (among other locations), and videos displayed on wall-of-eyes 180 and/or audio/video endcaps 190, in one embodiment of the present invention.

Listening posts (exemplified by listening posts 185 in FIG. 1B) are preferably provided in DSS 100 to allow a consumer to preview product content, although they can be configured to allow users to view product demonstrations, product stills, and other advertising content. A listening post is a dedicated device that can be configured, for example, to play audio samples from CDs for users (e.g., consumers) to preview. Several embodiments of listening posts 185 are described in commonly-owned U.S. Pat. No. 6,539,417. Listening posts 185 are connected to multimedia server 160 via network 150. Several modules are employed in operating the Listening posts.

First is the user interface module, which implements a user interface, used by the consumer to interact with the Listening post. The user interface module provides one or more ways for the consumer to interact with the system. In the example of playing music clips from CD's, these include:

A barcode scanner

Forward (FWD) button

Reverse (REV)button

Volume up (UP) button

Volume down (DN) button

The barcode scanner allows the consumer to scan the barcode any product in the department. When a barcode is scanned, the UPC is transmitted to multimedia server 160 to be handled by the audio playback communications module. The listening post will decode the compressed audio files which are streamed from the multimedia server and display the text on the liquid crystal display (LCD). When the FWD button is pressed, an interrupt is sent to multimedia server 160 notifying the audio communications module to take appropriate action. When the REV button is pressed, an interrupt is sent to multimedia server 160 notifying the audio communications module to take appropriate action. The volume buttons are self-explanatory.

A display module is provided to manage the display of information. The display module decodes the audio files which are sent from multimedia server 160. The display module also retrieves any text data sent along with the compressed audio data and displays it on the Listening post's display.

A multimedia server communications module is provided to allow communication between the Listening post and multimedia server 160. The server communications module is responsible for logging on to the multimedia server when the Listening post is initialized. When a barcode is scanned, the server communications module transmits the UPC to, for example, multimedia server 160 (although other nodes on the network, such as NOC 110 or NMC 120, may also be accessed). Similarly, when either the FWD or REV buttons are pressed, the server communications module notifies multimedia server 160, in order that the proper selection is provided to the user. The server communications module also acts as the "sentry" that recognizes a compressed audio file being sent from the multimedia server 160 and routes it to the display module.

The various providers provide content to NMC 110 (or other entity) for editing and storage in digital file format, in order to provide a constantly updated library of content to sample. Each content sample consists of a number of segments (e.g., several available music clips), preferably 3. In the example of music CDs, each segment is a music clip that is preferably a 25–30 second "hook" from a song, edited from a sample CD. Preferably, this is the second or third chorus of each song preceded by a 4 6 second transition phrase.

An average of 400 new 3 song album samples may be added to the network each month (although a greater or lesser number of samples could be added); simultaneously, a similar number of older samples will be deleted each month. Additions and deletions are preferably implemented twice per week (approx. 50 samples at a time), although this periodicity may be easily altered. Additions and deletions may also be scheduled ahead of time.

Content may be delivered to the consumer over headphones, which can be snapped out and replaced easily by NMC (or other) representatives, while still maintaining security and strain relief when in use. Wireless headphones or speakers, among other audio output devices, may also be used. Enclosures will have the capability to be easily retrofitted for small speakers. Listening posts 185 may also be configured to provide video content, in order to enhance the consumer's previewing experience by providing video content, such as music video clips corresponding to the audio clip being played.

Listening posts may be, for example, of two types: dedicated and non-dedicated (although other configurations can easily be envisioned by one of skill in the art). Dedicated Listening posts include elements such as a barcode scanner, two-line LCD panel, Ethernet card, TCP/IP stack, FTP client, and other components necessary to support the requisite communications and the previewing of content and advertising. Functionality provided by a dedicated Listening post includes, but is not limited to the following:

Perform scanning functions

Perform user button press functions (e.g., navigation, volume)

Retrieve and playback audio files as well as read text files to display on LCD panel from server according to UPC code and user button presses The listening posts communicates with multimedia server 160 via a networking protocol, such as FTP, over network 150. Files associated with each UPC are stored in a special directory on the server which will provide for rapid lookup given a particular UPC. Usage statistics and listening post files are stored in unique directories for each listening post.

In contrast, non dedicated Listening posts, while similar to the dedicated posts, perform some slightly different functions. The audio output from the unit may be looped into the line in on one of the audio/visual endcaps' soundcards. Functionality provided by a non dedicated Listening post includes, but is not limited to the following:

Periodically retrieving 'featured' CD list and home video list files from server and store internally for fast lookup Performing listening post functions for non-featured titles (non video titles), and perform normal statistics gathering for titles Notifying of UPC scans to the interactive endcap PC for featured titles Button press notification to the interactive endcap Listening posts 185 may be standalone, or may be associated with audio/video endcaps 190 and/or in-line home video station 161, which are connected to multimedia server 160 by one or more connections. One connection may be provided for the computer portion and one connection for the listening post, for example. The non dedicated listening post and audio/video endcap may be configured to communicate over network 150 via, for example, a TCP socket connection.

For featured titles and home videos, the UPC is sent to the audio/video endcap's computer through a TCP socket connection. No audio need be played by the listening post during such a transaction. Optionally, for non video and non-featured titles, a UPC code of 00000000000 may be sent to the audio/video endcap's computer to designate that a static graphic should be displayed.

All button presses are preferably sent to the audio/video endcap's computer (e.g., through a TCP socket). Volume settings and content navigation may be handled by the audio/video endcap's computer. The listening post output may remain constant at this juncture. The audio/video endcap's computer may be configured to ignore button presses when a non-featured title is currently being played by the listening post.

IX. Audio/Video Endcaps

Audio/video endcaps 190 allow users to preview audio and video samples. Examples of such endcap systems are described in commonly-owned U.S. Pat. No. 5,815,471 and commonly-owned U.S. Pat. No. 5,990,879. Another example of such systems is described in commonly-owned U.S. Pat. No. 5,084,768.

Audio/video endcaps 190 may be PC based systems, or may use another computer platform (e.g., a workstation, a single board computer, or other processing platform). One or more of the computer's storage units preferably contains all of the content (video, audio, graphics, text, and so on) associated with the products featured at the endcap. It will be connected to the multimedia server via network 150.

The user interface of audio/video endcaps 190 includes several ways for the consumer to interact with the system, five examples of which are now listed. First is a barcode scanner, which allows the consumer to scan the barcode of products, such as CDs featured at an endcap, or any other product in the department. For example, when a barcode of a CD is scanned, the UPC is transmitted to the endcap's computer. If the CD is a featured product, content is played back per the scan interrupt script. If the CD is not a featured product, the UPC is transmitted to the multimedia server to be handled by the audio playback communications module. The endcap may then emulate a listening post by playing the audio files which are streamed from the multimedia server and display the text on the endcap's display (e.g., an LCD display). For example, if a home video is scanned at the interactive endcap, a graphic screen may be displayed instructing the consumer to scan the video at in-line home video station 161.

Several controls are provided to allow the user to control the presentation. The user can control which of the possible audio and/or video clips are being played. If the forward (FWD) button is pressed while the music video for a featured product is playing, the video is interrupted, and preferably, if an audio preview is available, it should begin to play. The number of times the FWD button generates a new audio preview is dependent upon the number of previews available for a given CD. If the FWD button is pressed during the last preview, a text string (or other data) may be displayed indicating that no more previews are available. Alternatively, the play may cycle back to the beginning. If the FWD button is pressed while audio files from the multimedia server are being played (i.e., the product scanned was not a featured product) the endcap emulates a listening post by sending a FWD button interrupt to the multimedia server.

The reverse (REV) button has no effect unless a second or subsequent audio file is being played. If the REV button is pressed during a second or subsequent audio preview, the preview is interrupted and the previous audio file begins playing. If the REV button is pressed during the music video or the first audio preview, a text string will be displayed instructing the consumer to press the FWD button for more previews. If the REV button is pressed while the PC is playing a second or subsequent audio file from the multimedia server (i.e., the product scanned was not a featured product) the PC will then emulate a listening post by sending a REV button interrupt to the multimedia server.

The audio/video endcaps allow the user to adjust the volume of the audio portion of the presentation. Pressing the up button increases the audio volume within a preset range. Pressing the DOWN button decreases the audio volume within a preset range.

The audio/video endcap's display module of plays multimedia data based on information contained in the scan interrupt script and the attract script. Following are examples of the types of multimedia data that can be displayed, although the audio/video endcaps may be configured other types of multimedia may be displayed:

Compressed video files with audio

Compressed audio only files

Graphics files—icons for video overlay

Graphics files—icons and backgrounds

Text files—video overlay

Text files—overlaid on graphics

Text files displayed on the LCD

A script module is responsible for interpreting data contained in at least the "attract script" and the "scan interrupt script" script files. The attract script defines what is displayed on the color monitor and the LCD when no consumers are using the system. Following are exampled of the color monitor display elements which may be controlled by the attract script:

Video clips (incl. attract videos, product videos, sponsor videos and bumpers, etc.)

Video clip order and frequency

Video clip in/out date and time

Graphic overlays per clip

Text overlays per clip

The following LP display elements which may be controlled by the attract script:

Text files (instructional text, promotional text, advertising text, etc.)

Text file order and frequency

Text file in/out date and time

LCD text files (or the files containing the data to be displayed) may be linked to particular video clips or played independently.

The scan interrupt script defines what is displayed on the color monitor and the LCD when a consumer scans the barcode of a featured CD. The scan interrupt script may be configured to contain a look-up table which references the UPC of featured products to elements associated with that product. This is likely the simplest method, but other methods exist which are equally effective (e.g., a list of names and descriptions). For example, the following are elements which may be associated with a CD's UPC, among others:

Music video file

Graphic icon overlays for music video

Text overlays for music video

Audio files (multiple)

Graphic screens for display during audio only playback

Graphic screen for display when a home video is scanned

Graphic screen for display when the UPC is not recognized

Icon overlays for audio only screens

Text overlays for audio only screens (song titles, liner notes, etc.)

Text files to be displayed on the LCD

The scan interrupt script may also define data, such as corporate sponsor bumpers, that can be displayed on the color monitor and LP display before or after the scanned product data is displayed.

A statistics file can also be maintained on the audio/video endcap. Data logged on a daily (or weekly or monthly or other) basis by any one of the nodes in the present invention includes, but is not limited to:

Number of scans per product

Number of times a selection is accessed by the FWD button

Number of times a selection is accessed by the REV button

Number of times a selection plays by default

All UPC codes not recognized by system

The server communications module is responsible for logging on to multimedia server 160 when an interactive endcap initializes. Multimedia server 160 may be configured to periodically send new or updated files to the interactive endcap. The multimedia server communications module (or software modules on the Listening post or audio/video endcap) processes the files, optionally in background mode. This is done to ensure that files that are replaced are not in use. The files that are no longer required by the scripts may be deleted, preferably at this time. On a scheduled basis (also, optionally, in background mode), the multimedia server communications module (or other, as indicated) may send the daily statistics data to multimedia server 160, NOC 120, NMC 110, or other node/entity on the network (e.g., the information might be supplied to a distributor, or directly to the manufacturer, for marketing purposes, or to implement just-in-time stocking).

The system may be configured to offer shoppers a video clip (e.g., a 30 second full-motion MPEG-1 video clip), followed by one or more audio clips (e.g., three 25- to 30-second audio clips). This may be done each time a featured title is scanned, for example. Sponsorship may employ a model that provides a number of sponsor slots in the unit's programming. The system may also provide placement on wall-of-eyes 180 to sponsors that are on audio/video endcaps 190 (or other sponsors or entities).

A display (e.g., a 20" TV monitor) is preferably mounted on top of and slightly behind the existing endcap fixture, with a scanner enclosure preferably mounted into the top center slot of the fixture. Input from the user may take many forms. This could be, for example, a scan of a UPC code or a button touch on a system keypad. The fixtures on a rack are preferably configured to hold one or more of the products for which information is available at the endcap. For example, the fixtures on a rack might hold 42 CD facings (jewel cases) (6 rows×7 columns) or 28 facings (long box security cases, 4 rows×7 columns). Other configurations for holding CDs (or other audio/video products, or other products in general) are, of course, possible.

Assuming a CD music configuration with 42 facings, most or all of the content preferably changes monthly, with 10–11 titles added/deleted once a week, video content may be from several sources and in several forms. Such content might, for example, be edited from tape provided by the recording company. Audio content is preferably identical to the content developed for the Listening post system, but that need not be the case. Preferably, the system plays audio only samples of any title in the department through its speakers, with an onscreen graphic explaining that only audio is available for that title. A custom attract mode may also be provided for the initial system launch, and revised at prescribed intervals. Attract modes may be customized for seasons, holidays, special themes, or for other reasons, to provide an appropriate for the recordings/videos/products being promoted.

Audio/video endcaps 190 may run the following software, among other software:
  Audio/video Endcap Software
  TCP/IP services The above modules may be loaded at initialization, if desired, or may be loaded at a later time. The audio/video endcap software provides the basic functionality required for the endcap's operation, while the TCP/IP services provide connectivity to multimedia server 160 (although other networking protocols and standards could be employed to provide such functionality). Each endcap may store content locally (or may retrieve content from one or more nodes one [sic] the network) and need not feed data from the server over the network in real time, if that is desired. Preferably, however, content is delivered with normal distributions.

X. In-Line Home Video Station

In-line home video station 161 is preferably based on a PC-compatible system, although a single board computer of any architecture, a workstation, or other system may be used. The computer of in-line home video station 161 preferably contains the content (video, graphics, text, etc.) associated with the home video products featured in the department. This may be 400 or more such items. Preferably, the computer is connected to the multimedia server via Ethernet, although other networking architectures may be used, as may serial lines and other modes of communication. In-line home video station 161 possesses functionality similar to that of an audio/visual endcap, although certain features may be deleted or changed.

The content displayed by in-line home video station 161 is preferably in-home video selections, although other audiovisual information (e.g., product demonstrations) can be displayed by in-line home video station 161 in response to its selection by a consumer. Users can pick up any video box in the section, scan the UPC code (or indicate the identity of the video by some other input means), and receive a video sample of the film (e.g., a 30 second, full-motion video review or advertisement for the selected title).

Using this system, video previews may have a superimposed box cover and title on screen during the video. Other on screen graphics (such as pricing and release date info) may be made available and are easily changeable using the present system videos and video clips may be delivered in a compressed, digital format (e.g., MPEG 1 format). Content may be edited, for example, by pulling 30 second clips directly off tape supplied by manufacturers (the preferred method), editing down the 90 120 second dealer trailers supplied by labels, or editing out two 15 second segments from the full length movie and splicing them to a 30 second clip, Preferably, all titles in the department are previewable.

Preferably, the commercial entity provides the NMC operator a monthly list of titles to be updated, along with key contact names at video manufacturers. Of course, any method of title selection may be used to determine which titles will be used. For example, tapes (and titles) may be provided directly by manufacturers. Sponsor messages from one or more Sponsors may precede requested videos. As with the music endcap, home video Sponsors will appear on wall-of-eyes 180. In-line home video station 161 preferably has a custom attract mode, which may be changed periodically and be tied to seasons, holidays and special events, for example.

XI. In-Line Computer Hardware and Software Display

The in-line computer advertising of computer hardware and software (exemplified by in-line computer hardware and software display 165) may use, for example, a PC-compatible, interactive hardware and software preview system (preferably displayed "onshelf" as a standard computer available for sale), although another computing platform could easily be used. Thus, information is delivered on computer products for sale at the commercial sales outlet and/or through the commercial entity. As such, it may be located in-line in the computer aisle, or elsewhere, if desired. Access may be with a mouse and keyboard, for example (although any one of a multitude of common input/output devices may be employed). The in-line display computer will be connected to the multimedia server via a connection to network 150.

The user interface is defined by the user interface module. If consumers wish to purchase a previewed product, they may select the product(s), input name/address information via the keyboard, press a "print" button and receive a dot matrix printed ticket with an order number. They need only to hand the ticket to a cashier to pay for the product and have it shipped home or delivered to the store within a few days. NMC 110 need not be involved in the transaction process beyond providing content, collecting information, and ticket printing.

Alternatively, the user might enter a code into the system (e.g., the person's phone number), make the desired selections, and send the information to the commercial sales outlet's computer via the network. The user might then pickup and pay for the item when departing the commercial sales outlet, or may have the item shipped to a desired location.

In order to track consumer information, a statistics module is also provided. The statistics module will maintain a statistics file on the PC (or elsewhere on the network(e.g., on multimedia server 160)). Following are examples of the data that may be logged on a daily basis:
  Number of selections for previewing per product
  Number of tickets issued per product Content is provided from multimedia server 160. Consumers have access to previews of multiple computer hardware and software products, representing computer products available through the commercial entity. In operation, for example, by clicking on screen with a mouse, the user may search by manufacturer, feature set, price range, and/or other criteria, and will be presented with full color graphics, text, audio, video, and so on, summarizing the key features and benefits of each product.

The NMC operator (or another entity) can collect camera ready art of the computer products to be offered for sale from the manufacturers, along with key selling points, and may create and deliver, informational messages on each product available for sale. A basic fee may be charged to the manufacturer, on a per message basis. Content is preferably changed periodically. For example, content maybe changed at the rate of 5 10 titles per month, and delivered to stores on a semiweekly basis (or more or less often) if desired (or necessary). The NMC operator (or another entity) may develop attract modes highlighting various computer products, features, tips, and/or other information. Sponsorship may come from a number of sponsors, for example computer related product/service companies, or from companies unrelated to the computer industry.

XII. Direct Video

As noted, data sent via communications network 125 can be of several types. For example, receiver/decoder 135 may provide audiovisual training information to video cassette recorder (VCR) 140 via the direct video capabilities that communications network 125 may support (e.g., real time analog, high definition television (HDTV), or digital video information). Training VCR 140 allows such audiovisual information to be recorded for later playback, to allow the audiovisual information to be replayed for off line training or during multiple training sessions.

Alternatively, the audiovisual information transferred via the direct video capabilities that communications network 125 may be displayed on television 141 in real time by properly configuring VCR 140. Such information may include informational programs, training programs for outlet employees, and other business related information intended for personnel at commercial sales outlet 130.

XIII. General System Operation

Digital department system 100 operates in the following manner. Promotional content and informational content from advertiser 102, recording company 104, movie studio 106, and/or other content provider 108 (among other such providers) is collected and compiled by NMC 110, and converted into digital data files 122 by digitization. Alternatively, NMC 110 may assemble the necessary promotional materials from publicly available or privately available information sources (CDs, other recordings, videos, and other sources) for distribution. Additionally, such promotional materials may not require digitization, in which case the information may be distributed using analog techniques.

Assuming that digitization is the preferable means of distributing this information, digital data files 122 are provided to NOC 120 for distribution via satellite to one or more commercial sales outlets (as exemplified by commercial sales outlet 130). However, satellite distribution is but one way of distributing digital data files 122. Other methods, such as wide-area networks (WAN), internet connections (via, for example, an independent service provider (ISP)), or other electronic distribution medium could be employed in place of communications system 125 (FIG. 1A).

Again, assuming a satellite multicast system is employed, receiver/decoder 135 receives and decodes the digital information representing digital data files 122 at commercial sales outlet 130. Digital data files 122 are then forwarded from receiver/decoder 135 to multimedia server 160 for distribution. Digitized video or analog video may then also be supplied to training VCR 140 and/or to television 141, for the in store use of employees being trained, for example. Multimedia server 160, as indicated in Appendix A, distributes the promotional information in digital data files 122 to various points in commercial sales outlet 130 (e.g., wall-of-eyes 180, in store radio system 170, in-line computer hardware and software display 165, audio/video endcaps in other departments 195, listening posts 185, and other destinations).

Additionally, multimedia server 160 may be connected to on-line services 200 or (either directly or via entity LAN 210 to on-line internet commerce access system 220) to provide on-line access to promotional materials by customers accessing the system over the internet or by dial up lines, for example. Information provided to in store radio system 170 may either be digitized or analog audio, and may be provided in predetermined segments and timeslots, or may preempt current in-store programming.

In-line computer hardware and software 165 displays promotional materials stored either on storage systems within in-line computer hardware and software display 165 or on multimedia server 160, for example. The promotional materials, preferably relating to computer hardware and software, offer the customer an on-line catalog which the customer can browse and select products for purchase end. An example of its operation would be as follows.

A customer would browse the on-line catalog; select the desired computer products, enter a unique code identifying the customer (e.g., the customer's phone number), and then proceed in one of two ways. First, the customer could simply print out an order and proceed to the checkout area, provide the slip to a clerk who would then provide the computer products to the customer. Alternatively, the customer could go to the checkout and simply provide their customer code to receive the desired computer products. Another alternative would be for the customer to pay for the products at the checkout and have the commercial entity ship the computer products to the customer home address, or to another location. The system would display graphics, full-motion video, and technical information, possibly along with audio information, in informing the customer as to the various computer products for sale. In-line computer hardware and software display 165 allows integration into digital department system 100 and offers yet another avenue of promotional content delivery.

An example of DDS 100 is also provided in the accompanying Appendix. The Digital Department System™ described in the Appendix includes certain elements, features and functions of a system embodying the concepts of the present invention.

The foregoing description of preferred embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto. It should be noted that all trademarks and copyrights used or recited herein are the property of their respective owners.

What is claimed is:

1. A method for cataloguing and scripting consumer informational content, the consumer informational content corresponding to products for sale in commercial sales outlets, comprising the steps of:

cataloging portions of the consumer informational content, wherein the portions are cataloged by indicia including a uniform product code, and type of content;

defining temporal and geographic information related to the portions, wherein the temporal information includes dates and times for dissemination of each of the portions to one or more consumers and wherein the geographical information includes location of at least one commercial sales outlet;

generating one or more scripts for controlling the dissemination of certain of the portions, wherein the controlling is based on factors including the temporal and geographical information and wherein the certain of the portions are selected according to the temporal and geographic information; and transmitting the one or more scripts and the certain of the portions to the one or more commercial sales outlets; wherein:

the portions include a video bumper, an attract loop, a wall of eyes script, data specifying text and graphic overlays for titles during video and audio playback, text strings used during an endcap attract mode, and an endcap setting used during an endcap audio playback;

generating one or more scripts includes performing at least one operation on at least one of the portions, the at least one operation including editing, deleting and copying; and a wall of eyes is a display that includes two or more display devices.

2. The method according to claim 1, further comprising executing a wall of eyes script at a wall of eyes in at least one commercial sales outlet, wherein executing the wall of eyes script includes:

controlling display of video clips on the wall of eyes;

controlling order and frequency of display of the video clips;

controlling video clip in/out data and time;

controlling graphic overlays associated with each of the video clips; and controlling text overlays associated with each of the video clips.

3. The method according to claim 2, wherein separate files are scripted for each content element handled by the wall of eyes script module.

4. The method according to claim 2, wherein separate regionalized versions of program content are controlled by the wall of eyes script module.

5. The method according to claim 2, further including switching from execution of the wall of eyes script to delayed live feed programs for the purpose of displaying from live action sources at least one member selected from the group that includes special events and messages.

6. A system for cataloging and scripting consumer informational content, the consumer informational content corresponding to products for sale in commercial sales outlets, comprising:

means for cataloging portions of the consumer informational content, wherein the portions are cataloged by indicia including a uniform product code and type of content;

means for defining temporal and geographic information relate to the portions, wherein the temporal information includes dates and times for dissemination of each of the portions to one or more consumers and wherein the geographical information includes location of at least one commercial sales outlet;

means for generating one or more scripts for controlling the dissemination of certain of the portions, wherein the controlling is based on factors including the temporal and geographical information and wherein the certain of the portions are selected according to the temporal and geographic information; and means for transmitting the one or more scripts and the certain of the portions to the one or more commercial sales outlets; wherein:

the portions include a video bumper, an attract loop, a wall of eyes script, data specifying text and graphic overlays for titles during video and audio playback, text strings used during an endcap attract mode, and an endcap setting used during an endcap audio playback;

the means for generating one or more scripts includes means for performing at least one operation on at least one of portions, the at least one operation including editing, deleting and copying; and a wall of eyes is a display that includes two or more display devices.

7. The system according to claim 6, further comprising means for executing a wall of eyes script at a wall of eyes in at least one commercial sales outlet, wherein means for executing the wall of eyes script includes:

means for controlling video clips displayed on a wall of eyes;

means for controlling video clip order and frequency;

means for controlling video clip in/out data and time;

means for controlling graphic overlays per clip; and means for controlling text overlays per clip.

8. The system according to claim 7, wherein separate files are scripted for each content element handled by the wall of eyes script module.

9. The system according to claim 7, wherein separate regionalized versions of program content are controlled by the wall of eyes script module.

10. The system according to claim 7, further comprising means for switching from execution of the wall of eyes script to delayed live feed programs for the purpose of displaying from live action sources at least one member selected from the group that includes special events and messages.

* * * * *

UNITED STATES PATENT AND TRADEMARK OFFICE
Certificate

Patent No. 7,069,274 B2                                                                                 Patented: June 27, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael R. Stern, Mill Valley, CA (US); William L. Mince, Menlo Park, CA (US); and Daniel E. Kyte, San Francisco, CA (US)

Signed and Sealed this Thirtieth Day of March 2010.

<div style="text-align: right;">
Charles Rones<br>
<em>Supervisory Patent Examiner</em><br>
Art Unit 2164
</div>